United States Patent
Schwartz et al.

(10) Patent No.: US 6,898,323 B2
(45) Date of Patent: May 24, 2005

(54) MEMORY USAGE SCHEME FOR PERFORMING WAVELET PROCESSING

(75) Inventors: Edward L. Schwartz, Sunnyvale, CA (US); Michael J. Gormish, Redwood City, CA (US); Martin Boliek, San Francisco, CA (US); Kok Gi Wu, Daly City, CA (US)

(73) Assignee: Ricoh Company, Ltd., Tokyo (JP)

( * ) Notice: Subject to any disclaimer, the term of this patent is extended or adjusted under 35 U.S.C. 154(b) by 473 days.

(21) Appl. No.: 09/784,928

(22) Filed: Feb. 15, 2001

(65) Prior Publication Data

US 2002/0168112 A1 Nov. 14, 2002

(51) Int. Cl.⁷ .................................................. G06K 9/36
(52) U.S. Cl. ........................................ 382/240; 382/305
(58) Field of Search ................................. 382/305, 302, 382/276, 277, 307, 232, 233, 240, 248, 238–239; 375/240.11, 240.19, 240.24, 240.18–240.21, 240.25; 345/535, 555, 540, 545, 550

(56) References Cited

U.S. PATENT DOCUMENTS

| | | |
|---|---|---|
| 3,580,655 A | 5/1971 | Leith et al. |
| 3,950,103 A | 4/1976 | Schmidt-Weinmar |
| 4,136,954 A | 1/1979 | Jamieson |
| 4,155,097 A | 5/1979 | Lux |
| 4,190,861 A | 2/1980 | Lux |
| 4,223,354 A | 9/1980 | Noble et al. |
| 4,393,456 A | 7/1983 | Marshall, Jr. |
| 4,437,087 A | 3/1984 | Petr |
| 4,569,075 A | 2/1986 | Nussbaumer |
| 4,599,567 A | 7/1986 | Goupillaud et al. |
| 4,652,881 A | 3/1987 | Lewis |
| 4,663,660 A | 5/1987 | Fedele et al. |
| 4,674,125 A | 6/1987 | Carlson et al. |
| 4,701,006 A | 10/1987 | Perlmutter |
| 4,751,742 A | 6/1988 | Meeker |

(Continued)

FOREIGN PATENT DOCUMENTS

| | | |
|---|---|---|
| EP | 0510933 A1 | 10/1992 |
| EP | 0593013 A2 | 4/1994 |
| EP | 0611051 A1 | 8/1994 |
| EP | 0622741 A2 | 11/1994 |
| EP | 701375 A2 | 3/1996 |

(Continued)

OTHER PUBLICATIONS

Chrysafis et al., An algorithm for low memory wavelet image compression, IEEE 0–7803–5467–2/99, pp. 354–358.*

(Continued)

Primary Examiner—Leo Boudreau
Assistant Examiner—Ishrat Sherali
(74) Attorney, Agent, or Firm—Blakely, Sokoloff, Taylor & Zafman, LLP

(57) ABSTRACT

A system comprising a memory and wavelet processing logic is described. The memory is sized to include lines to store a band of an image and additional lines. The wavelet processing logic comprises a wavelet transform and access logic. The wavelet transform generates coefficients when applied to data in the memory. The access logic reads data from the memory into the line buffers to supply data stored in the memory to the wavelet transform and to store coefficients in the memory, such that after data stored at a first pair of lines is read from memory into the buffers of the access logic. The access logic reuses the first pair of lines to store coefficients generated by the wavelet transform that are associated with a second pair of lines different from the first pair of lines.

32 Claims, 26 Drawing Sheets

U.S. PATENT DOCUMENTS

| | | | |
|---|---|---|---|
| 4,760,563 A | 7/1988 | Beylkin | |
| 4,785,348 A | 11/1988 | Fonsalas et al. | |
| 4,785,349 A | 11/1988 | Keith et al. | |
| 4,799,179 A | 1/1989 | Masson et al. | |
| 4,805,129 A | 2/1989 | David | |
| 4,815,023 A | 3/1989 | Arbeiter | |
| 4,817,182 A | 3/1989 | Adelson et al. | |
| 4,821,223 A | 4/1989 | David | |
| 4,827,336 A | 5/1989 | Acampora et al. | |
| 4,829,378 A | 5/1989 | LeGall | |
| 4,837,517 A | 6/1989 | Barber | |
| 4,839,889 A | 6/1989 | Gockler | |
| 4,858,017 A | 8/1989 | Torbey | |
| 4,864,398 A | 9/1989 | Avis et al. | |
| 4,868,868 A | 9/1989 | Yazu et al. | |
| 4,881,075 A | 11/1989 | Weng | |
| 4,894,713 A | 1/1990 | Delogne et al. | |
| 4,897,717 A | 1/1990 | Hamilton et al. | |
| 4,899,147 A | 2/1990 | Schiavo et al. | |
| 4,904,073 A | 2/1990 | Lawton et al. | |
| 4,918,524 A | 4/1990 | Ansari et al. | |
| 4,922,544 A | 5/1990 | Stansfield et al. | |
| 4,929,223 A | 5/1990 | Walsh | |
| 4,929,946 A | 5/1990 | O'Brien et al. | |
| 4,936,665 A | 6/1990 | Whitney | |
| 4,973,961 A | 11/1990 | Chamzas et al. | |
| 4,974,187 A | 11/1990 | Lawton | |
| 4,982,283 A | 1/1991 | Acampora | |
| 4,985,927 A | 1/1991 | Norwood et al. | |
| 4,987,480 A | 1/1991 | Lippman et al. | |
| 4,999,705 A | 3/1991 | Puri | |
| 5,000,183 A | 3/1991 | Bonnefous | |
| 5,001,764 A | 3/1991 | Wood et al. | |
| 5,014,134 A | 5/1991 | Lawton et al. | |
| 5,018,210 A | 5/1991 | Merryman et al. | |
| 5,049,992 A | 9/1991 | Citta et al. | |
| 5,049,993 A | 9/1991 | Le Gall et al. | |
| 5,068,911 A | 11/1991 | Resnikoff et al. | |
| 5,072,308 A | 12/1991 | Lin et al. | |
| 5,073,964 A | 12/1991 | Resnikoff | |
| 5,081,645 A | 1/1992 | Resnikoff et al. | |
| 5,095,447 A | 3/1992 | Manns et al. | |
| 5,097,261 A | 3/1992 | Langdon, Jr. et al. | |
| 5,097,331 A | 3/1992 | Chen et al. | |
| 5,101,280 A | 3/1992 | Moronaga et al. | |
| 5,101,446 A | 3/1992 | Resnikoff et al. | |
| 5,103,306 A | 4/1992 | Weiman et al. | |
| 5,109,451 A | 4/1992 | Aono et al. | |
| 5,121,191 A | 6/1992 | Cassereau et al. | |
| 5,124,930 A | 6/1992 | Nicolas et al. | |
| 5,128,757 A | 7/1992 | Citta et al. | |
| 5,128,791 A | 7/1992 | LeGall et al. | |
| 5,148,498 A | 9/1992 | Resnikoff et al. | |
| 5,152,953 A | 10/1992 | Ackermann | |
| 5,156,943 A | 10/1992 | Whitney | |
| 5,173,880 A | 12/1992 | Duren et al. | |
| 5,182,645 A | 1/1993 | Breeuwer et al. | |
| 5,223,926 A | 6/1993 | Stone et al. | |
| 5,235,434 A | 8/1993 | Wober | |
| 5,241,395 A | 8/1993 | Chen | |
| 5,262,958 A | 11/1993 | Chui et al. | |
| 5,276,525 A | 1/1994 | Gharavi | |
| 5,303,200 A | 4/1994 | Elrod et al. | |
| 5,315,670 A | 5/1994 | Shapiro | |
| 5,321,776 A | 6/1994 | Shapiro | |
| 5,335,016 A | 8/1994 | Nakagawa | |
| 5,347,479 A | 9/1994 | Miyazaki | |
| 5,349,348 A | 9/1994 | Anderson et al. | |
| 5,379,355 A | 1/1995 | Allen | |
| 5,381,145 A | 1/1995 | Allen et al. | |
| 5,384,869 A | 1/1995 | Wilkinson et al. | |
| 5,412,741 A | 5/1995 | Shapiro | |
| 5,414,780 A | 5/1995 | Carnahan | |
| 5,416,604 A | 5/1995 | Park | |
| 5,420,891 A | 5/1995 | Akansu | |
| 5,442,458 A | 8/1995 | Rabbani et al. | |
| 5,453,945 A | 9/1995 | Tucker et al. | |
| 5,455,874 A | 10/1995 | Ormsby et al. | |
| 5,481,308 A | 1/1996 | Hartung et al. | |
| 5,495,292 A | 2/1996 | Zhang et al. | |
| 5,497,435 A | 3/1996 | Berger | |
| 5,511,151 A | 4/1996 | Russell et al. | |
| 5,534,925 A | 7/1996 | Zhong | |
| 5,537,493 A | 7/1996 | Wilkinson | |
| 5,541,594 A | 7/1996 | Huang et al. | |
| 5,546,477 A | 8/1996 | Knowles et al. | |
| 5,563,960 A | 10/1996 | Shapiro | |
| 5,566,089 A | 10/1996 | Hoogenboom | |
| 5,600,373 A | 2/1997 | Chui et al. | |
| 5,602,589 A | 2/1997 | Vishwanath et al. | |
| 5,631,977 A | 5/1997 | Koshi et al. | |
| 5,638,498 A | 6/1997 | Tyler et al. | |
| 5,657,085 A | 8/1997 | Katto | |
| 5,701,367 A | 12/1997 | Koshi et al. | |
| 5,717,789 A | 2/1998 | Anderson et al. | |
| 5,754,793 A | 5/1998 | Eom et al. | |
| 5,808,683 A | 9/1998 | Tong et al. | |
| 5,809,176 A | 9/1998 | Yajima | |
| 5,850,482 A | 12/1998 | Meany et al. | |
| 5,867,602 A | 2/1999 | Zandi et al. | |
| 5,880,856 A | 3/1999 | Ferriere | |
| 5,966,465 A | 10/1999 | Keith et al. | |
| 5,999,634 A | 12/1999 | Abbott et al. | |
| 6,005,901 A | 12/1999 | Linz | |
| 6,020,975 A | 2/2000 | Chen et al. | |
| 6,026,198 A | 2/2000 | Okada | |
| 6,031,940 A | 2/2000 | Chui et al. | |
| 6,088,062 A | 7/2000 | Kanou et al. | |
| 6,088,395 A | 7/2000 | Wang et al. | |
| 6,101,279 A | 8/2000 | Nguyen et al. | |
| 6,118,902 A | 9/2000 | Knowles | |
| 6,121,970 A | 9/2000 | Guedalia | |
| 6,128,413 A | 10/2000 | Benamara | |
| 6,160,846 A | 12/2000 | Chiang | |
| 6,201,897 B1 * | 3/2001 | Nixon | 382/248 |
| 6,229,929 B1 | 5/2001 | Lynch et al. | |
| 6,236,765 B1 | 5/2001 | Acharya | |
| 6,237,010 B1 | 5/2001 | Hui et al. | |
| 6,263,109 B1 | 7/2001 | Ordentlich et al. | |
| 6,263,120 B1 | 7/2001 | Matsuoka | |
| 6,266,450 B1 | 7/2001 | Yip et al. | |
| 6,275,531 B1 | 8/2001 | Li | |
| 6,327,392 B1 | 12/2001 | Li | |
| 6,330,666 B1 | 12/2001 | Wise et al. | |
| 6,332,043 B1 | 12/2001 | Ogata | |
| 6,339,658 B1 | 1/2002 | Moccagatta et al. | |
| 6,343,155 B1 * | 1/2002 | Chui et al. | 382/240 |
| 6,350,989 B1 | 2/2002 | Lee et al. | |
| 6,356,668 B1 | 3/2002 | Honsinger et al. | |
| 6,442,298 B1 * | 8/2002 | Nixon | 382/248 |
| 6,442,302 B2 | 8/2002 | Klassen | |
| 6,466,698 B1 | 10/2002 | Creusere | |
| 6,483,946 B1 | 11/2002 | Martucci et al. | |
| 6,486,981 B1 | 11/2002 | Shimura et al. | |
| 6,492,916 B1 | 12/2002 | Schwartz et al. | |
| 6,546,143 B1 * | 4/2003 | Taubman et al. | 382/240 |
| 6,549,673 B1 | 4/2003 | Ammicht et al. | |
| 6,606,416 B1 | 8/2003 | Yip et al. | |
| 6,625,321 B1 | 9/2003 | Li et al. | |
| 6,650,782 B1 | 11/2003 | Joshi et al. | |
| 6,658,159 B1 | 12/2003 | Taubman | |

| | | | |
|---|---|---|---|
| 6,668,090 B1 | 12/2003 | Joshi et al. | |
| 6,795,504 B1 * | 9/2004 | Xu et al. | 375/240.19 |
| 2001/0003544 A1 | 6/2001 | Kajiwara et al. | |
| 2001/0021223 A1 | 9/2001 | Andrew | |
| 2001/0047517 A1 | 11/2001 | Christopoulos et al. | |
| 2003/0110299 A1 | 6/2003 | Larsson et al. | |

FOREIGN PATENT DOCUMENTS

| | | |
|---|---|---|
| EP | 0967556 A2 | 12/1999 |
| EP | 1035511 A2 | 9/2000 |
| EP | 1035511 A2 | 9/2000 |
| EP | 1164781 A1 | 12/2001 |
| GB | 2 211 691 A | 7/1989 |
| GB | 2 284 121 A | 5/1995 |
| GB | 2 285 374 A | 7/1995 |
| GB | 2 293 733 A | 4/1996 |
| GB | 2 293 734 A | 4/1996 |
| GB | 2 303 030 A | 2/1997 |
| GB | 2303030 A | 2/1997 |
| GB | 2 303 031 A | 2/1997 |
| GB | 2 341 035 A | 3/2000 |
| JP | 406038193 A | 7/1992 |
| JP | 06-245077 | 9/1994 |
| JP | 6-350989 | 12/1994 |
| JP | 7-79350 | 3/1995 |
| WO | WO 88/10049 | 12/1988 |
| WO | WO 91/03902 | 3/1991 |
| WO | WO 91/18361 | 11/1991 |
| WO | WO 93/10634 | 5/1993 |
| WO | WO 94/17492 | 8/1994 |
| WO | WO 94/23385 | 10/1994 |
| WO | WO 95/19683 | 7/1995 |
| WO | WO 96/09718 | 3/1996 |
| WO | WO 00/49571 | 8/2000 |
| WO | WO 01/16764 A1 | 3/2001 |

OTHER PUBLICATIONS

Wu, Xiaolin, et al., "On Optimal Multi-resolution Scalar Quantization," Dept. of Computer Science, Univ. of Western Ontario, London, ON, Canada, 2002, pp. 322–331.*

Chae, et al., Blocking Artifact Reduction in JPEG–Coded Images, IEEE 0–7803–5467–2, pp. 894–898, published Oct. 24–28, 1999, ® 1999 IEEE.

International Standard, Information Technology—JPEG 2000 image coding system—Part 1: Core coding system, ISO/IEC 15444–1, First edition Dec. 15, 2000, pp. ii–226.

Antonini, et al., "Image Coding Using Wavelet Transform", IEEE Transactions on Image Processing, vol. 1, No. 2, Apr. 1992, pp. 205–220.

Blumberg, et al., "Visual Realism and Interativity for the Internet", IEEE, 1997, pp. 269–273.

Boliek, et al., "Decoding compression with reversible embedded wavelets (CREW) codestreams", Journal of Electronic Imaging, Jul. 1998, vol. 7 (3), pp. 402–409.

Boliek, et al., "JPEG 2000 for Efficient Imaging in a Client/Server Environment", Proceedings of the PIE, SPIE, Bellingham, VA, US, vol. 4472, Jul. 31, 2001, pp. 212–223, XP008010308.

Boliek, et al., "JPEG 2000 Next Generation Image Compression System", IEEE 0–7803–6297, 45–48.

Calderbank, et al., "Wavelet Transforms That Map Integers to Integers", Aug. 1996.

Carey, et al: "Regularity–Preserving Image Interpolation", IEEE Transactions on Image Processing, vol. 8., No. 9, Sep. 1999, pp. 1293–1297, XP002246254.

Carrato, et al: "A Simple Edge–Sensitive Image Interpolation Filter", Proceedings of the International Conference on Image Processing (ICIP) Lausanne, Sep. 16–19, 1996, New York, IEEE, US, vol. 1, pp. 711–714, XP010202493.

Chen, et al., "Wavelet Pyramid Image Coding with Predictable and Controllable Subjective Picture Quality", IEICE Trans. Fundamentals, vol. E76–A., No. 9, Sep. 1993, pp. 1458–1468.

Cheong, et al., "Subband Image Coding with Biorthogonal Wavelets", IEICE Trans. Fundamentals, vol. E75–A., No. 7, Jul. 1992, pp. 871–881.

Chrysafis, et al., "An Algorith for Low Memory Wavelet Image Compression", IEEE 0–7803–5467–2/99, p. 354–358.

Chrysafis, et al., "Line Based Reduced Memory, Wavelet Image Compression," Data Compression Conference, 1998, DCC '98, Proceedings Snowbird, UT, Mar. 1998, pp. 398–407.

Chui, et al., "Wavelets on a Bounded Interval", Numerical Methods of Approximation Theory, vol. 9, 1992, p. 53–75.

Chrochiere, et al., "Digital Coding of Speech in Sub–bands", 1976, American Telephone and Telegraph Company, The Bell System Technical Journal, vol. 55, No. 8, Oct. 1976, p. 1069–1085.

Denk, et al., "Architectures for Lattice Structure Based Orthonormal Discrete Wavelet Transforms", IEEE, 1994, pp. 259–270.

Deshpande, et al., "HTTP Streaming of JPEG2000 Images", IEEE, 2001, pp. 15–19.

Dutch Search Report, 133082, Nov. 26, 1996.

Esteban, et al., "1977 IEEE International Conference on Acoustics, Speech & Signal Processing", "Application of Quadrature Mirror Filters to Split Band Voice Coding Schemes", p. 191–195.

French Search Report, FR9511023, Nov. 26, 1996.

French Search Report, FR9511024, Nov. 26, 1996.

German Search Report, Dated Mar. 21, 1997, 3 pages.

Gharavi, et al., "Proceedings: ICASSP 87", 1987 International Conference on Acoustics, Speech and Signal Processing, Apr. 6, 7, 8, 9, 1987, vol. 4 of 4, "Application of Quadrature Mirror Filtering to the Coding of Monochrome and Color Images", p. 2384–2387.

Gharavi, et al., "Sub–band Coding of Digital Images Using Two–Dimensional Quadrature Mirror Filtering:, SPIE vol. 707 Visual Communications and Image Processing", 1986, p. 51–61.

Gordon, Benjamin M., et al., "A 1.2 mW Video–Rate 2–D Color Subband Decoder," IEEE Journal of Solid–State Circuits, IEEE Inc. New York, vol. 30, No. 12, Dec. 1, 1995, pp. 1510–1516.

Hauf, et al., "The FlashPix™ Image File Format", The Fourth Color Imaging Conference: Color Science, Systems and Application, 1996, pp. 234–238.

Howard, et al., "Fast and Efficient Lossles Image Compression", IEEE, 1993, pp. 351–360.

Information Technology—JPEG 2000 Image Coding System—Part 1: Core Coding System, ISO/IEC 15444–1, Dec. 15, 2000, p. 5, 14, 22.

International Search Report for Application No.: GB 9518298.6, dated Nov. 8, 1995.

JPEG 2000 Part 1 Final Committee Draft Version 1.0, Image Compression Standard described in ISO/IEC 1/SC 29/WG 1 N1646, Mar. 16, 2000.

Komatsu, et al., "Reversible Subband Coding of Images", SPIE vol. 2501, pp. 676–648.

Langdon, Jr., "Sunset: A Hardware–Oriented Algorithm for Lossless Compression of Gray Scale Images", *SPIE vol. 1444, Image Capture, Formatting, and Display,* 1991, pp. 272–282.

Le Gall, et al., "Sub–band coding of Digital Images Using Symmetric Short Kernal Filters and Arithmetic Coding Techniques", 1988, International Conference on Acoustics, Speech and Signal Processing, pp. 761–764.

Lewis, et al., "Image Compression Using the 2–D Wavelet Transform", *IEEE Transactions on Image Processing,* vol. 1, No. 2, Apr. 1992, pp. 244–250.

Lux, P., "A Novel Set of Closed Orthogonal Functions for Picture Coding", 1977, pp. 267–274.

Marcellin, et al., "An Overview of JPEG–2000", Proceedings. DCC 2000 Snowbird, UT, USA, Mar. 28–30, 2000, pp. 523–541, XP010377392.

Meng, Teresa H., "A Wireless Portable Video–on–Demand System," VLSI Design, 1998, Proceedings Eleventh International Conference on Chennai, India 407, Jan. 1998, California, pp. 4–9.

Ohta, et al., "Wavelet Picture Coding with Transform Coding Approach", Jul. 1992, No. 7, pp. 776–784.

Padmanabhan, et al., "Feedback–Based Orthogonal Digital Filters", *IEEE Transactions on Circuits and Systems,* 8/93, No. 8, pp. 512–525.

Pollara et al., "Rate–distortion Efficiency of Subband Coding with Integer Coefficient Filters", Jul. 1994, p. 419, Information Theory, 1994, IEEE.

Reeves, et al: "Multiscale–Based Image Enhancement", Electrical and Computer Engineering, 1997. Engineering Innovation: Voyage of Discovery. IEEE 1997 Canadian Conference on St. Johns, NFLD., Canada May 25–28, 1997, New York, NY. (pp. 500–503), XP010235053.

Reusens, "New Results in Subband/Wavelet Image Coding", May, 1993, p. 381–385.

Said, et al., "Image Compression Using the Spatial–Orientation Tree", *IEEE,* 1993, pp. 279–282.

Said, et al., "Reversible Image Compression Via Multiresolution representation and Predictive Coding", Aug. 11, 1993, pp. 664–674.

Shah, et al., "A Chip Set for Lossless Image Compression", *IEEE Journal of Solid–State Circuits,* vol. 26, No. 3, Mar. 1991, pp. 237–244.

Shapiro, J. M., "An Embedded Hierarchical Image Coder Using Zerotrees of Wavelet Coefficients", *IEEE,* 1993, pp. 214–223.

Shapiro, J. M., "Embedded Image Coding Using Zerotrees of Wavelet Coefficients", *IEEE Transactions on Signal Processing,* 12/93, No. 12, pp. 3445–3462.

Smith, et al., "Exact Reconstruction Techniques for Tree–Structured Subband Coders", IEEE Transactions on Acoustics, Speech, and Signal Processing, vol. ASSP–34, No. 3, Jun. 1986, p. 434–441.

Stoffel, et al: "A Survey Of Electronic Techniques For Pictorial Image Reproduction," IEEE Transactions On Communications, vol. COM–29, No. 12, Dec. 1981, pp. 1898–1925, XP000560531 IEEE, New York (US).

Szu, et al., "Image Wavelet Transforms Implemented by Discrete Wavelet Chips", *Optical Engineering,* Jul. 1994, vol. 33, No. 7, pp. 2310–2325.

Vetterli, Martin, "Filter Banks Allowing Perfect Reconstruction", Signal Processing 10 (1986), p. 219–244.

Vetterli, Martin, "Multi–Dimensional Sub–band Coding: Some Theory and Algorithms", Signal Processing 6 (1984) p. 97–112.

Villasenor, et al., "Filter Evaluation and Selection in Wavelet Image Compression", *IEEE,* 1994, pp. 351–360.

Westernick, et al., "Proceedings: ICASSP 87", 1987 International Conference on Acoustics, Speech, and Signal Processing, Apr. 6, 7, 8, 9, 1987, vol. 3 of 4, "Sub–band coding of Images Using Predictive Vector Quantization", p. 1378–1381.

Woods, "Subband Image Coding", 1991, pp. 101–108, 163–167, and 180–189.

Woods, et al., "Subband Coding of Images", *IEEE Transactions on Acoustics, Speech, and Signal Processing,* vol. 1 ASSP–34, No. 5, Oct. 1986, pp. 1278–1288.

Woods, et al., "Sub–band coding of Images", Proceedings ICASSP 86, Tokyo, Japan, Apr. 1986, p. 1005–1008.

Wu, et al., "New Compression Paradigms in JPEG2000", Applications of Digital Image Processing XXIII, San Diego, CA USA, Jul. 31–Aug. 3, 2000, vol. 4115, pp. 418–429, XP008013391, Proceedings of the DPIE—The International Society for Optical Engineering, 2000, SPIE–Int. Soc. Opt. Ent., USA.

Xiong, et al., "Joint Optimization of Scalar and Tree–structured Quantization of Wavelet Image Decompositions", Jan. 11, 1993, pp. 891–895.

Chrysafis, Christos, et al. "Line Based Reduced Memory, Wavelet Image Compression," Data Compression Conference, 1998, DCC '98, Proceedings Snowbird, UT, Mar. 1998, pp. 398–407.

* cited by examiner

Input 301

Level 1 (302)

Level 2 (303)

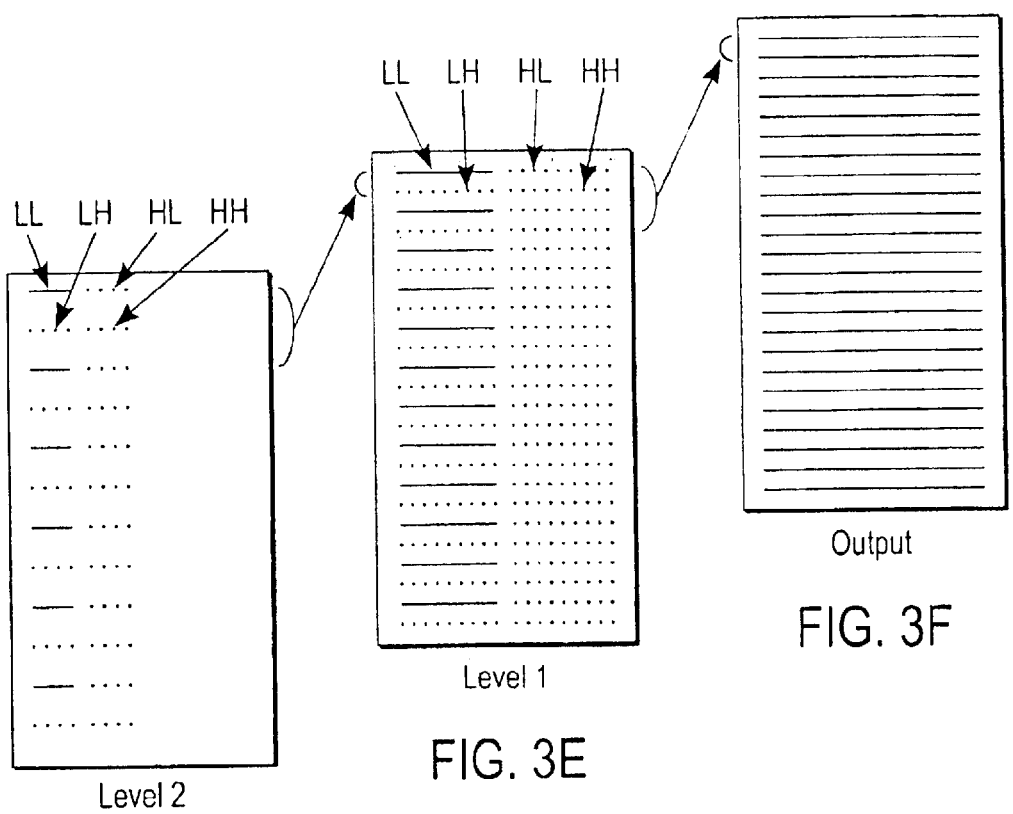
FIG. 3D Level 2
FIG. 3E Level 1
FIG. 3F Output

| 3LL | 3HL | 3LH | 3HH | 2HL | 2LH | 2HH | 1HL | 1LH | 1HH |
|---|---|---|---|---|---|---|---|---|---|
|  |  |  | 0 |  |  | 3 |  |  | 8 |
|  | 0 | 0 | 0 | 1 | 1 | 3 | 4 | 4 | 8 |
| 0 | 0 | 0 | 0 | 1 | 1 | 3 | 4 | 4 | 8 |
| 0 | 0 | 0 | 0 | 1 | 1 | 3 | 4 | 4 | 8 |
| 0 | 0 | 0 | 0 | 1 | 1 | 3 | 4 | 4 | 8 |
| 0 | 0 | 0 | 0 | 1 | 1 | 3 | 4 | 4 | 8 |
| 0 | 2 | 2 | 6 | 7 | 7 | 10 | 11 | 11 | 15 |
| 5 | 9 | 9 | 13 | 14 | 14 | 17 | 18 | 18 | 22 |
| 12 | 16 | 16 | 20 | 21 | 21 | 24 | 25 | 25 | 29 |
| 19 | 23 | 23 | 27 | 28 | 28 | 31 | 32 | 32 | 36 |
| 26 | 30 | 30 | 34 | 35 | 35 | 38 | 39 | 39 | 42 |
| 33 | 37 | 37 | 40 | 41 | 41 | 43 | 44 | 44 | 45 |

FIG. 23

| 3LL | 5HL,LH | 5HH | 4HL,LH | 4HH | 3HL,LH | 3HH | 2HL,LH | 2HH | 1HL,LH | 1HH |
|---|---|---|---|---|---|---|---|---|---|---|
|  |  | 1 |  | 1 |  | 2 |  | 2 |  | 2 |
|  | 1 | 1 | 1 | 1 | 2 | 2 | 2 | 2 | 2 | 2 |
| 0 | 1 | 1 | 1 | 1 | 2 | 2 | 2 | 2 | 2 | 2 |
| 0 | 1 | 1 | 1 | 1 | 2 | 2 | 2 | 2 | 2 | 2 |
| 0 | 1 | 1 | 1 | 1 | 2 | 2 | 2 | 2 | 2 | 2 |
| 0 | 1 | 1 | 1 | 1 | 2 | 2 | 2 | 2 | 2 | 2 |
| 0 | 1 | 1 | 1 | 1 | 2 | 2 | 2 | 2 | 2 | 3 |
| 0 | 1 | 1 | 1 | 3 | 3 | 3 | 3 | 3 | 3 | 3 |
| 0 | 3 | 3 | 3 | 3 | 3 | 3 | 3 | 3 | 3 | 3 |
| 0 | 3 | 3 | 3 | 3 | 3 | 3 | 3 | 3 | 3 | 3 |
| 0 | 3 | 3 | 3 | 3 | 3 | 3 | 3 | 3 | 3 | 3 |

Typical Decode of Color Images

Dumb Camera Encoder

Simple Camera Encoder

MEMORY USAGE SCHEME FOR PERFORMING WAVELET PROCESSING

FIELD OF THE INVENTION

The present invention relates to the field of compression and decompression; more particularly, the present invention relates to memory usage for performing wavelet processing.

BACKGROUND OF THE INVENTION

The new JPEG 2000 decoding standard (ITU-T Rec.T.800/ISO/IEC 154441:2000 JPEG 2000 Image Coding System) provides a new coding scheme and codestream definition for images. Although the JPEG 2000 standard is a decoding standard, the JPEG 2000 specifies encoding and decoding by defining what a decoder must do. Under the JPEG 2000 Standard, each image is divided into one or more rectangular tiles. If there is more than one tile, the tiling of the image creates tile-components that can be extracted or decoded independently of each other. Tile-components comprise all of the samples of a given component in a tile. An image may have multiple components. Each of such components comprises a two-dimensional array of samples. For example, a color image might have red, green and blue components.

After tiling of an image, the tile-components may be decomposed into different decomposition levels using a wavelet transformation. These decomposition levels contain a number of subbands populated with coefficients that describe the horizontal and vertical spatial frequency characteristics of the original tile-components. The coefficients provide frequency information about a local area, rather than across the entire image. That is, a small number of coefficients completely describe a single sample. A decomposition level is related to the next decomposition level by a spatial factor of two, such that each successive decomposition level of the subbands has approximately half the horizontal resolution and half the vertical resolution of the previous decomposition level.

Although there are as many coefficients as there are samples, the information content tends to be concentrated in just a few coefficients. Through quantization, the information content of a large number of coefficients is further reduced. Additional processing by an entropy coder reduces the number of bits required to represent these quantized coefficients, sometimes significantly compared to the original image.

The individual subbands of a tile-component are further divided into code-blocks. These code blocks can be grouped into partitions. These rectangular arrays of coefficients can be extracted independently. The individual bit-planes of the coefficients in a code-block are entropy coded with three coding passes. Each of these coding passes collects contextual information about the bit-plane compressed image data.

The bit stream compressed image data created from these coding passes is grouped in layers. Layers are arbitrary groupings of successive coding passes from code-blocks. Although there is great flexibility in layering, the premise is that each successive layer contributes to a higher quality image. Subband coefficients at each resolution level are partitioned into rectangular areas called precincts.

Packets are a fundamental unit of the compressed codestream. A packet contains compressed image data from one layer of a precinct of one resolution level of one tile-component. These packets are placed in a defined order in the codestream.

The codestream relating to a tile, organized in packets, are arranged in one, or more, tile-parts. A tile-part header, comprised of a series of markers and marker segments, or tags, contains information about the various mechanisms and coding styles that are needed to locate, extract, decode, and reconstruct every tile-component. At the beginning of the entire codestream is a main header, comprised of markers and marker segments, that offers similar information as well as information about the original image.

The codestream is optionally wrapped in a file format that allows applications to interpret the meaning of, and other information about, the image. The file format may contain data besides the codestream.

The decoding of a JPEG 2000 codestream is performed by reversing the order of the encoding steps. FIG. 1 is a block diagram of the JPEG 2000 standard decoding scheme that operates on a compressed image data codestream. Referring to FIG. 1, a bitstream initially is received by data ordering block 101 that regroups layers and subband coefficients. Arithmetic coder 102 uses contextual information collected during encoding about the bit-plane compressed image data, and its internal state, to decode a compressed bit stream.

After arithmetic decoding, the coefficients undergo bit modeling in coefficient bit modeling block 103. Next, the codestream is quantized by quantization block 104, which may be quantizing based on a region of interest (ROI) as indicated by ROI block 105. After quantization, an inverse transform is applied to the remaining coefficients via transform block 106, followed by DC and optional component transform block 107. This results in generation of a reconstructed image.

The JPEG2000 standard leaves many choices to implementers.

SUMMARY OF THE INVENTION

A system comprising a memory and wavelet processing logic is described. The memory is sized to include lines to store a band of an image and additional lines. The wavelet processing logic comprises a wavelet transform and access logic. The wavelet transform generates coefficients when applied to data in the memory. The access logic reads data from the memory into the line buffers to supply data stored in the memory to the wavelet transform and to store coefficients in the memory, such that after data stored at a first pair of lines is read from memory into the buffers of the access logic. The access logic reuses the first pair of lines to store coefficients generated by the wavelet transform that are associated with a second pair of lines different from the first pair of lines.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 3A–F illustrate a transform memory organization for various levels depicting conceptually how coefficients may be stored for the forward (Figures A–C) and inverse (FIGS. 3D–F) transforms.

FIGS. 17 and 18 illustrate quantizers for one component for a three level 5,3 transform.

FIG. 19 illustrates an example of HVS weighted quantization.

FIG. 22 illustrates an example of layering for a 5,3 irreversible transform.

FIG. 23 illustrates an example in which transform has 5 levels and the data is divided up into layers 0–3.

DETAILED DESCRIPTION OF THE PRESENT INVENTION

Figure 1:
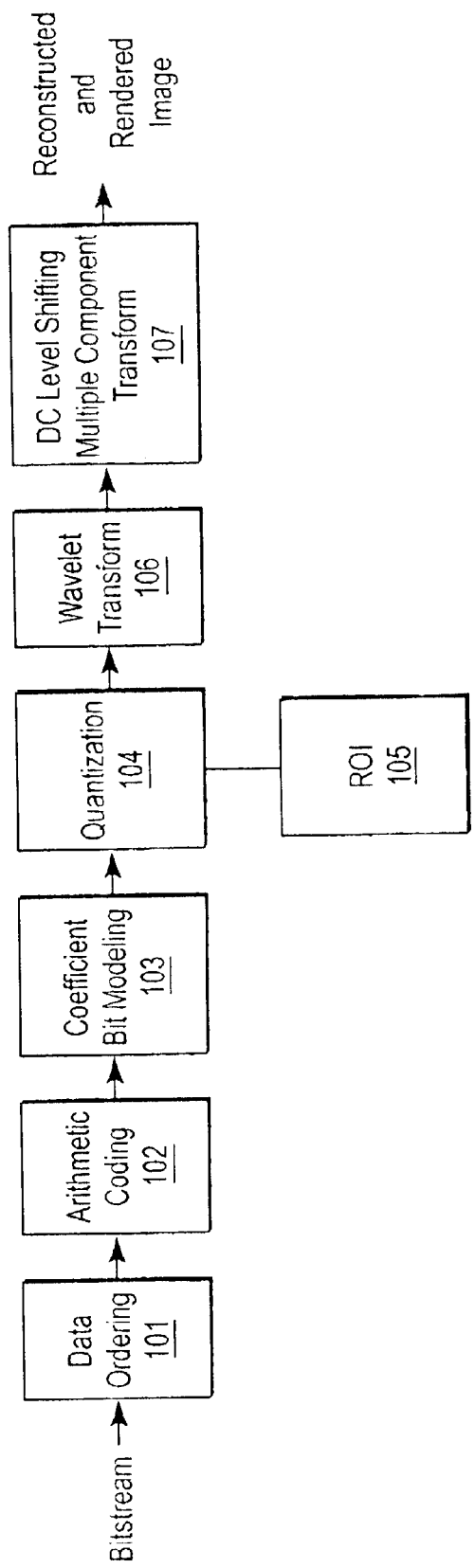
FIG. 1 is a block diagram of the JPEG 2000 standard decoding scheme.

Improvements to compression and decompression schemes are described. It is a purpose of the techniques and implementations described herein to use choices in JPEG 2000 to make high speed, low cost, low memory and/or feature rich implementations.

In the following description, numerous details are set forth in order to provide a thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

The following descriptions relate to implementations or novel ways to take advantage of the flexibility of JPEG 2000 or other coding schemes with similar features.

Memory Usage for Low Memory and Fast Burst Access

Figure 2:
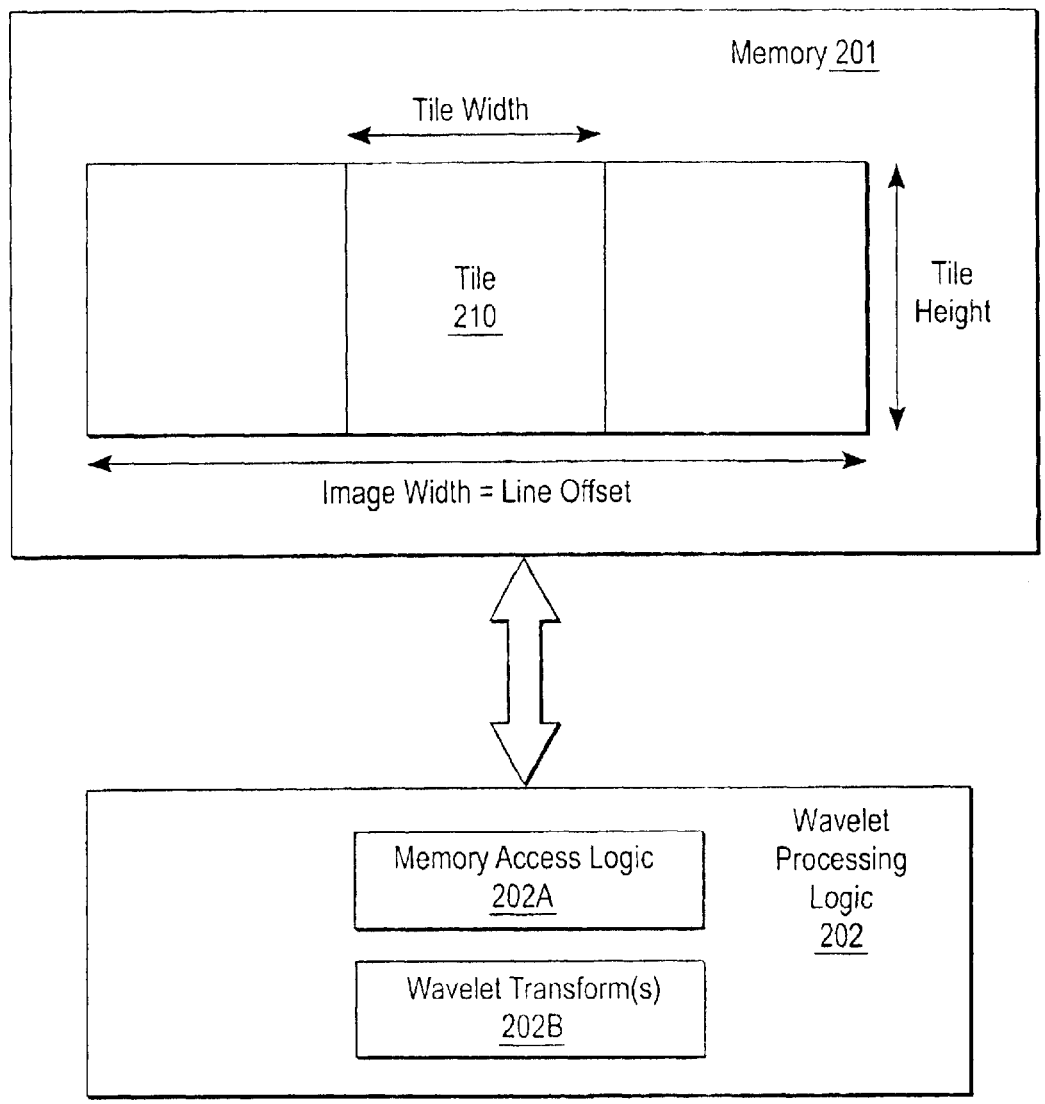
FIG. 2 illustrates one embodiment of an organization for an image in memory.

FIG. 2 shows one embodiment of an organization for an image in memory 201. Referring to FIG. 2, only the "tile height" raster lines, or a band of the image, are in memory 201, not the whole image. Thus, the amount of an image in memory 201 is equal to the image width multiplied by the tile height. Inside the band of the image is at least one tile, such as tile 210.

The wavelet transform processing logic 202 includes memory access logic 202A to read data from and store data to memory 201 to enable wavelet transform 202B to be applied to the data (image data or coefficients depending on the level of coefficient). Wavelet processing logic 202 may comprise hardware, software or a combination of both.

In one embodiment, access logic 202A accesses the tile with four parameters: a pointer or index to the start of the tile in memory, the width of the tile, the height of the tile, and the line offset to get from the start of one line to another (the image width). Alternatively, access logic 202A accesses memory 201 using a pointer or index to the end of the tile instead of the width of the tile.

In one embodiment, in order to access for each line of a tile or a portion of a line of an image to perform some function F, the following process may be used.

line=start
   for y=0 to tile_height−1
     for x=0 to tile_width−1
       perform function F with line[x]
     line=line+line_offset One of the functions F may include applying a wavelet transform on pairs of lines. Also another function F may be a DC level shift, multiple component transform.

Such a process would be performed by processing logic that may comprise hardware (e.g., dedicated logic, circuitry, etc.), software (such as is run on a general purpose computer system or a dedicated machine), or a combination of both.

In one embodiment, coefficients from a subband are accessed using a similar scheme with a starting point, width, height and line offset. Because rows of coefficients are stored together in memory, rows may be accessed efficiently when stored in cache, burst accessible memories or memories that are wider than one coefficient.

Figures 3A, 3B, 3C:
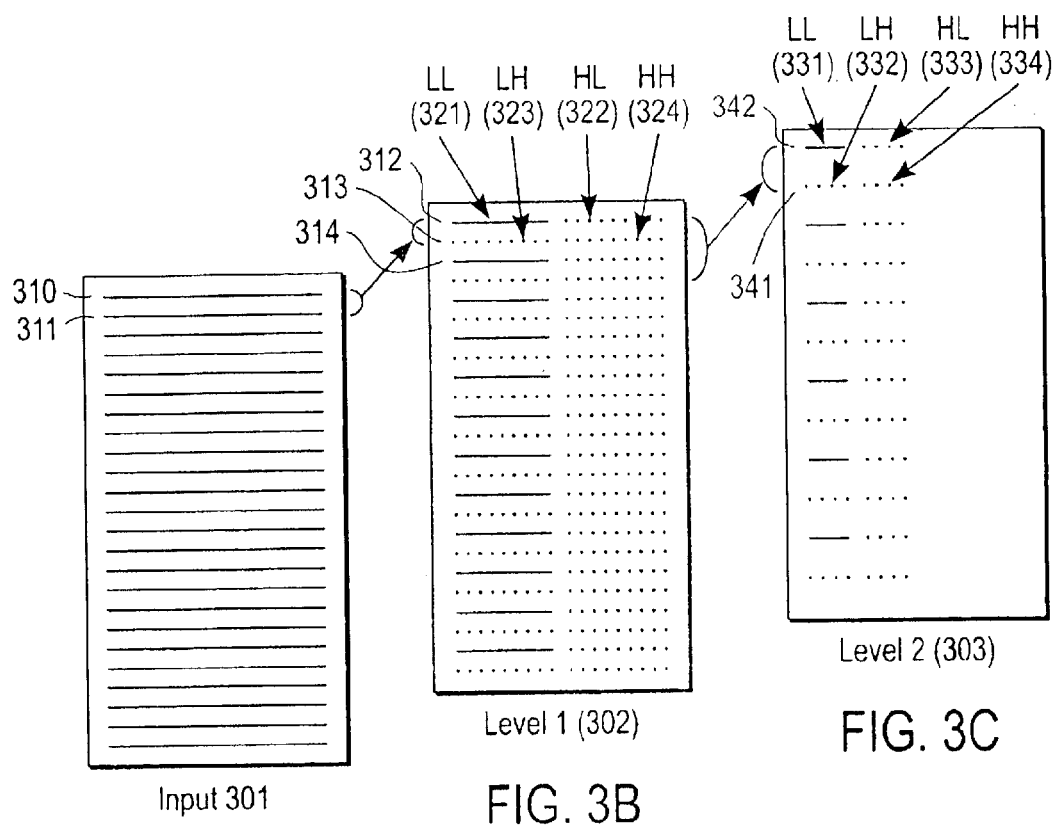

FIGS. 3A–C show a transform memory organization for various levels depicting conceptually how coefficients may be stored. All LH, HL and HH coefficients (using the nominclature of ITU-T Rec.T.800/ISO/IEC 154441:2000 JPEG 2000 Image Coding System) are coded. These coefficients are represented by dotted lines in FIGS. 3B and C. Input lines of input tile 301 and LL coefficients (shown as solid lines in FIGS. 3B and 3C in successive levels) only need to be stored temporarily while computing the transform with the exception of the final transform level's LL coefficients which are coded. When a transform is used that does the horizontal and vertical transforms in one pass and uses line buffers, once a pair of input rows has been completely read (input lines or LL coefficients), the space used by lines can be reused.

FIGS. 3A–C show input tile 301, level 1 (L1)(302) and level 2 (L2)(303) memory areas aligned with an offset to indicate how reuse might be accomplished in one embodiment. The addition of two rows, rows 312 and 313, to the memory space used to hold input tile 301, is needed to generate the L1 coefficients when reusing the memory for input tile 301 for L1 coefficients. The addition of four rows, rows 341–342, to the memory space used to hold the L1 coefficients is needed to generate the L2 coefficients when reusing the memory storing the L1 coefficients for L2 coefficients. (Note that there are two rows between rows 341 and 342 that are wasted space.) The additional lines are preferably behind the direction the wavelet transform is being applied to the information in the memory.

More specifically, a pair of input rows input tile 301 corresponds to one row of each of LL, LH, HL and HH coefficients at level 1, resulting from the application of a transform to two different lines and the results of applying the wavelet transform being written into lines of the memory. For example, the results of applying a wavelet transform to input rows 310 and 311 are the coefficients in portions of rows 312 and 313 of L1 coefficients (302). For example, LL coefficients 321 of row 312 corresponds to the LL coefficients (solid line) of level 1, HL coefficients 322 of row 312 corresponds to the HL coefficients of level 1, LH portion 323 of row 313 corresponds to the LH coefficients of level 1, and HH portion 324 corresponds to the HH coefficients of level 1. Note that the level 1 coefficients from the first two input lines are stored in two extra rows at the top of the memory with the remaining level 1 coefficients being written into the locations storing the data of input tile 301 to reuse the memory. The width and height for each type of coefficient (e.g., LH, HL, HH) for each subband of level 1 coefficients is half that of input tile 301. The line offset from the LL row to the next LL row for level 1 (e.g., the distance from row 312 to row 314 in FIG. 3B) is twice the tile width (since each coefficient row is from an area corresponding to two lines).

Similarly, the results of applying the wavelet transform to two rows of LL coefficients at level 1 (solid lines) are the coefficients in two rows namely LL coefficients (331), LH coefficients (332), HL coefficients (333) and HH coefficients (334) at level 2. The width and height for level 2 coefficients is a quarter that of input tile 301. The line offset for level 2 is four times the tile width (since each coefficient row is from an area corresponding to two level 1 LL rows or four input lines). Thus, four extra lines of memory are needed to use the same memory that is storing the input tile to store the L2 coefficients. Note that if a third decomposition level was being performed, an additional 8 lines would be needed. Thus, in this example, a total of 14 extra lines are needed to enable reuse of the memory that stores an input time and has two levels of decomposition applied thereto. A general formula may be used to determine the number of extra lines is as follows:

$$2^{(maxlevel+1)}-2.$$

To access subbands, such as the LL, LH, HL and HH subbands, only a starting pointer and the offset between rows/lines are necessary. The height and width are also needed to know when to stop when accessing a tile.

As the number of decomposition levels increases, some rows at the bottom of memory become unused. That is, the lines of memory below the L1 coefficients after the first decomposition level become unused, the lines of memory below the L2 coefficients after the second decomposition level become unused, etc. In one embodiment, this extra space may be reused.

FIGS. 3D–3F illustrate the corresponding inverse transform memory usage in which additional lines store the results of applying an inverse transform and those additional lines are in the memory behind the direction the inverse transform is being performed.

Figure 4A:
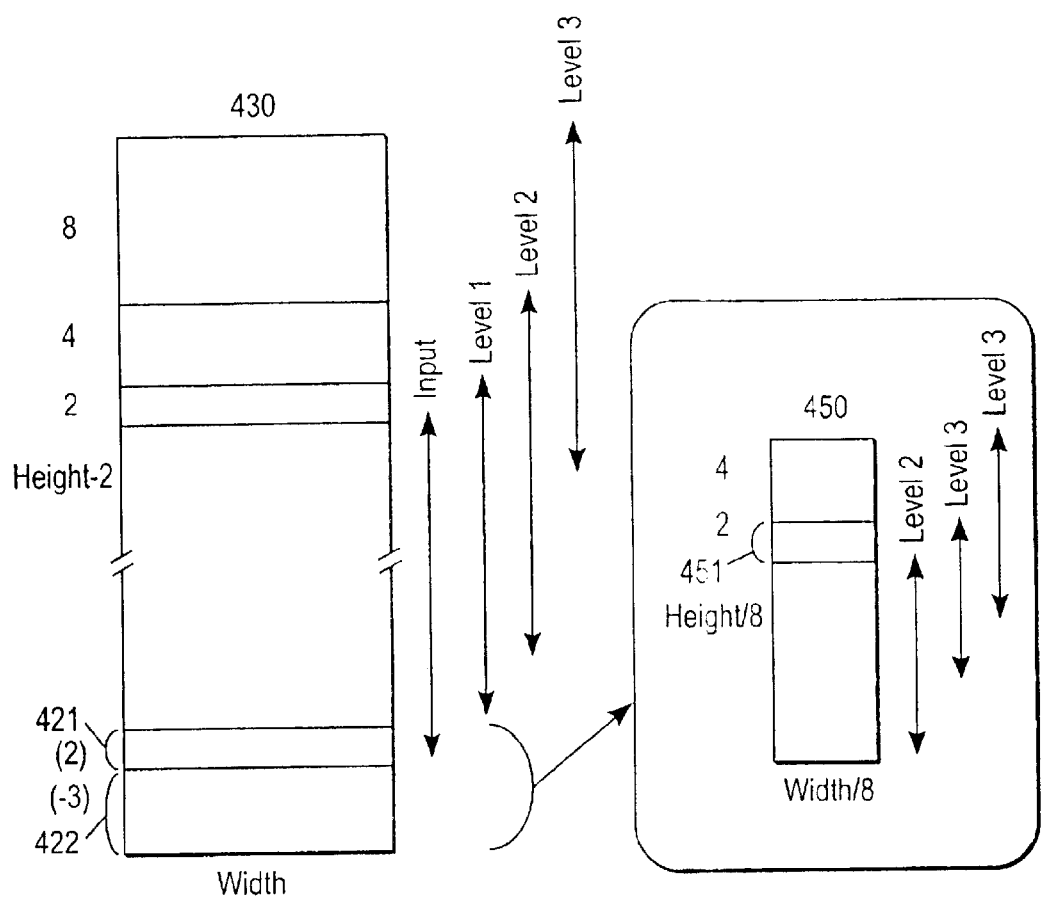
FIGS. 4A and B illustrate embodiments of a single memory where the input image data and the various decomposition levels of the image data can be stored during forward and inverse transforms, respectively.
Figure 4B:
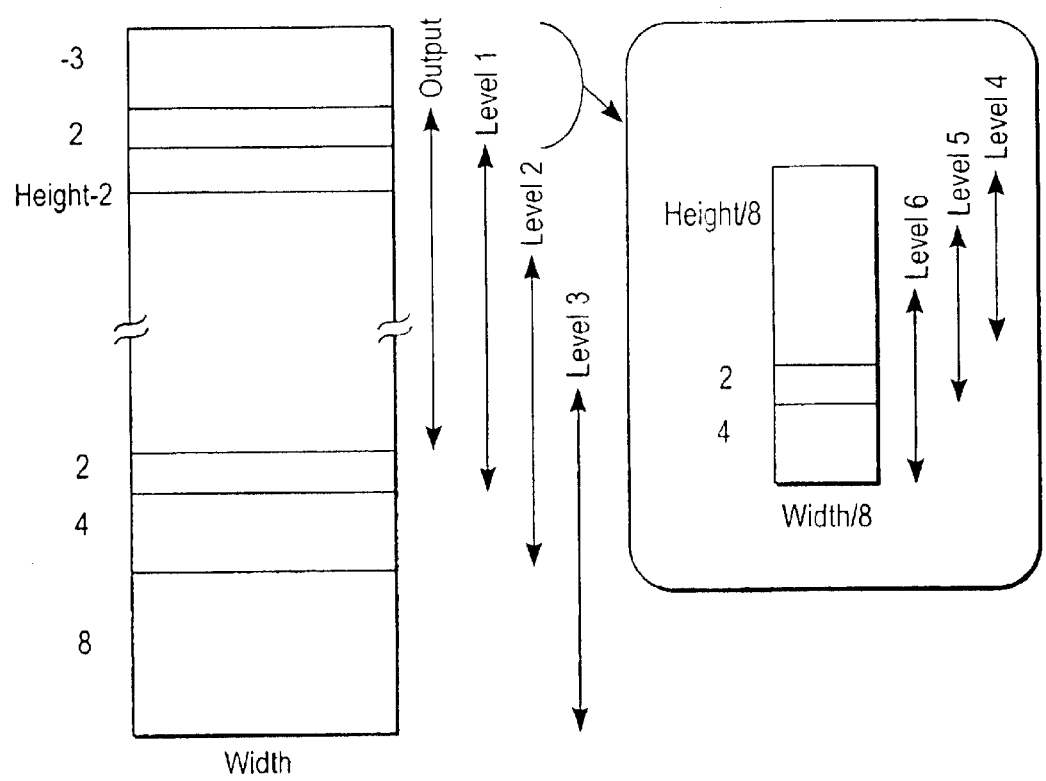

FIG. 4A shows one embodiment of a single memory where the input and the various levels can be stored during application of a forward transform. Referring to FIG. 4A, locations for the input tile, level 1 coefficients, level 2 coefficients, and level 3 coefficients is shown with the added 2, 4 and 8 lines respectively. FIG. 4B shows a similar single memory embodiment where the input coefficients of various levels of the transform can be stored along with the output during application of an inverse transform.

Table 1 shows the amount of memory required for various transform levels for a 256×256 tile for separate memories and reused memory.

TABLE 1

| level | Separate memory (bytes) | reused memory (bytes) |
|---|---|---|
| 1 | 256 × 256 = 65,536 | 2 × 256 = 512 |
| 2 | 128 × 128 = 16,384 | 4 × 256 = 1,024 |
| 3 | 64 × 64 = 4,096 | 8 × 256 = 2,048 |
| 4 | 32 × 32 = 1,024 | 16 × 256 = 4,096 |
| 5 | 16 × 16 = 256 | 32 × 256 = 8,192 |
| 6 | 8 × 8 = 64 | 64 × 256 = 16,384 |

For reused memory, the amount listed is the additional new memory used for that level. For this example, reusing memory for levels 1, 2 and 3 saves memory. Level 4 may use a separate memory.

The memory for levels 4,5 and 6 could be placed in a single memory after level 3 has been generated or in a completely different and separate memory. The amount of memory necessary is 38×32, which is less than 5×256. Because there are two unused lines after generating the level 1 coefficients (i.e., the memory that stored the last two lines of input data), a small memory savings can be achieved by letting the levels 4, 5 and 6 reuse these two lines. This is particularly important because the number of additional lines for levels 4, 5, and 6 is 16, 32 and 64, and the extra space between the lines will be twice as far and half as wide as the level before.

In one embodiment, coefficients from levels 4, 5, and 6 are packed in a smaller memory structure, such as storage area 450 in FIG. 4. Referring to FIG. 4, the level 4 coefficients are stored in an area having a height equal to the tile height divided by 8 ($2^3$ where 3 corresponds to the number of levels) and a width equal to the tile width w divided by 8 ($2^3$ where 3 corresponds to the number of levels previously stored elsewhere). An additional two lines 451 are all that is needed to store level 5 coefficients in the same necessary storage area. Similarly, an additional four lines is all that is necessary to accommodate using this memory storage area for the level 6 coefficients. Note that no lines are skipped when storing the coefficients. In one embodiment in which a 256×256 tile is being processed, the extra 5 lines at the bottom of storage area 430, two lines 421 and approximately 4.75 lines 422 are used to accommodate storage area 450. As shown, the approximate by three lines 422 represent allocated memory or in addition to that necessary to store the input tile. In this manner, the storage area for the input tile is almost completely reused.

In one embodiment, to use a very little, or potentially minimum, memory, level 6 is stored separately from levels 4 and 5. However, this only saves 64 bytes of memory.

A memory a little smaller than 273×256 can hold all the transform coefficients for a 256×256 tile. This is less than 7% more than a true in-place memory organization. Unlike an in-place memory organization, extra copies are avoided while simultaneously keeping the rows packed together for fast access.

Table 2 shows another example of using separate versus reused memory for 128×128 tiles. For this size, the first three transform levels can reuse memory in a 142×128 buffer.

TABLE 2

| level | Separate memory (bytes) | reused memory (bytes) |
|---|---|---|
| 1 | 128 × 128 = 16,384 | 2 × 128 = 256 |
| 2 | 64 × 64 = 4,096 | 4 × 128 = 512 |
| 3 | 32 × 32 = 1,024 | 8 × 128 = 1024 |

In one embodiment, a decision to use in-place memory or new memory is a function of tile height and transform level. Such a decision may be based on the following:

if tile height>$2^{(3*level-2)}$, then use in-place method
if tile height=$2^{(3*level-2)}$, then either may be used
if tile height<$2^{(3*level-2)}$, then use new memory
To illustrate the application of the decision, Table 3 below:

TABLE 3

| level | 2^(3*level-2) |
|---|---|
| 1 | 2 |
| 2 | 16 |
| 3 | 128 |
| 4 | 1024 |
| 5 | 8192 |

In some applications, adapting the memory organization to the tile height is inconvenient. A single fixed memory organization can be used. Tile sizes smaller than 128×128 typically result in bad compression performance, so would typically not be used. While tile sizes bigger than 1K×1K can be used for very large images, this does not significantly improve compression and the large amount of memory required would typically be burdensome. Therefore, assuming a tile height between 128 and 1024 inclusive and using in-place memory for 3 levels of the transform is a good heuristic.

Decoding is similar in that the results of applying an inverse transform are written ahead of where the decoding processing logic is reading, with the only notable difference being that the start is from the highest level to the lowest level, such as level 6 to level 1 in the example above. In such a case, the input tile ends up at the top of the memory structure. The extra lines to accommodate the memory reuse are in decreasing order. For example, using the structure of FIG. 4B, 8 lines would be necessary to create the L2 coefficients from the L3 coefficients, 4 extra lines would be necessary to create the L1 coefficients from the L2 coefficients and 2 extra lines would be necessary to create the input tile from the L1 coefficients.

Figure 5:
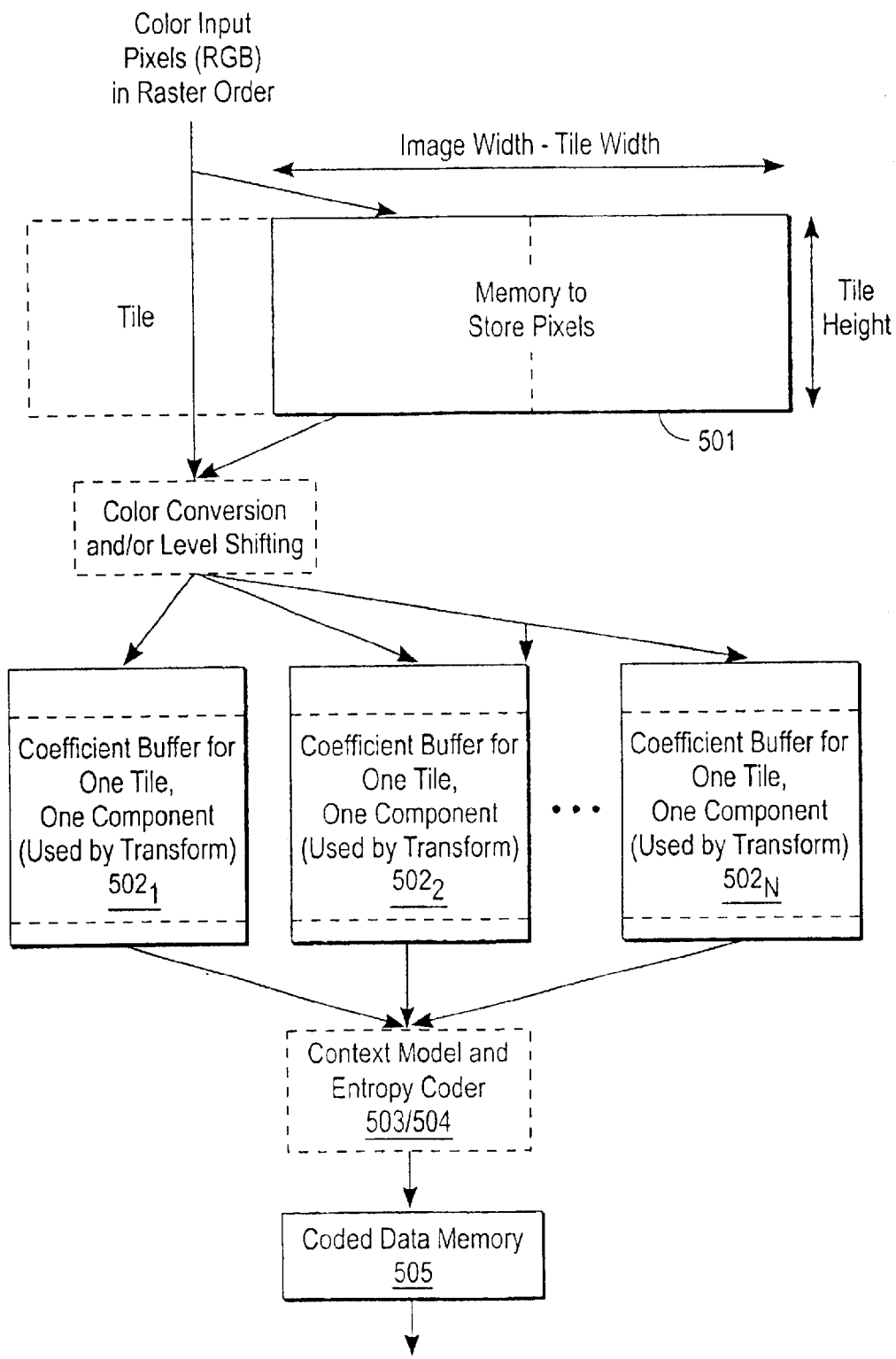
FIG. 5 illustrates one embodiment of the process of handling the input data.

In one embodiment, to handle input tile data, a color conversion may be performed on the data prior to encoding. FIG. 5 illustrates one embodiment of the process of handling the input data. Referring to FIG. 5, color input pixels are received in raster order. These color pixels may be in RGB, YCrCb, CMY, CMYK, grayscale, etc. The color input pixels may be stored as tiles in a memory, such as memory 501, by band (or other forms).

Pixels from storage 501 or received directly form the input undergo color conversion and/or level shifting, with the resulting outputs being stored in one coefficient buffers $502_1$–$502_N$. That is, once the color conversion has been completed on each tile, it is stored in one of the coefficient buffers $502_1$–$502_N$, and then the next tile can be processed. In one embodiment, there is one coefficient buffer for each component.

Coefficient buffers $502_1$–$502_N$ are used by the transform in the manner described above to perform the wavelet transform while reusing memory. Thus, coefficient buffers $502_1$–$502_N$ are both input and output to wavelet transform.

After the transform is applied to coefficient buffers $502_1$–$502_N$, the context model 503 and entropy coder 505 can perform further compression processing on the already transformed data. The coded data is buffered in coded data memory 505.

While performing the further compression processing on one tile, the transform may be applied to another tile. Similarly, any or all the operations may be performed on multiple tiles at the same time.

Progression Order Conversion

In the JPEG2000 standard, data in a compressed codestream can be stored in one of the five progression orders. The progression order can change at different points in the codestream. The order is defined by embedded "for layers" on layers, precincts, resolution, and components.

Five progression orders are described in the standard in Table A-16 of the JPEG 2000 standard. They are layer-resolution-component-position progression (LRCP), resolution-layer-component-position progression (RLCP), resolution-position-component-layer progression (RPCL), position-component-resolution-layer progression (PCRL), component-position-resolution-layer progression (CPRL).

The order may be defined in the COD or POC markers of the JPEG 2000 standard. The Coding style default (COD) marker is defined by the JPEG 2000 standard and describes the coding style, number of decomposition levels, and layering that is the default used for compressing all components of an image (if in the main header) or a tile (if in a tile-part header). The Progression order change (POC) marker describes the bounds and progression order for any progression order other than that specified in the COD marker segments in the codestream. The Packet Length Main Header (PLM) indicates a list of packet lengths in tile-parts for every tile part in order and the Packet Length, Tile-part header (PLT) indicates tile packet lengths in a tile-part and indicates where the data is in the codestream.

The JPEG 2000 standard in section B.12 only specifies how packets of compress data are formed for a given progression order. It does not describe how data should be converted from one progression order to another progression order.

Figure 6A:
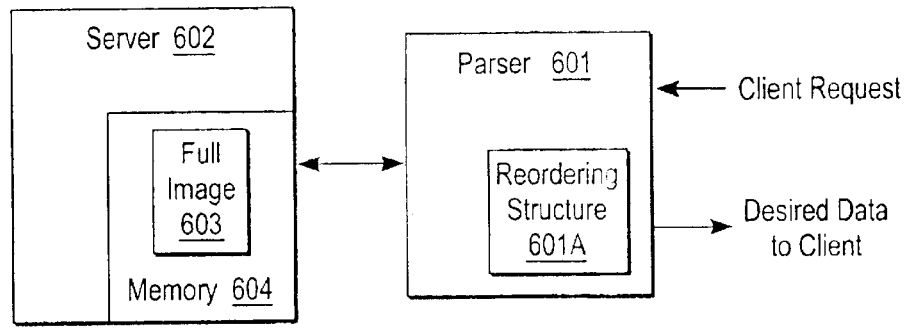
FIG. 6A illustrates a system having a progression order conversion parser.

In one embodiment, a progression order converting parser converts a codestream to a desired progression order based on the user input without decoding the data and then encoding it again. FIG. 6A illustrates a system having such a parser. Referring to FIG. 6A, parser 601 receives requests from a client for a particular progression order. The client may be viewing a web page and selects a particular link. In response to the request, parser 601 accesses server 602 to obtain the codestream associated with full image 603 from memory 604 and converts the codestream into a different progression order based on the request. The request indicates the progression order by using an optional command (e.g., RL2L (Resolution-layer progression to Layer Progression)). The progression order that is described may be based on layer, resolution, component, precinct, or tile.

Figure 6B:
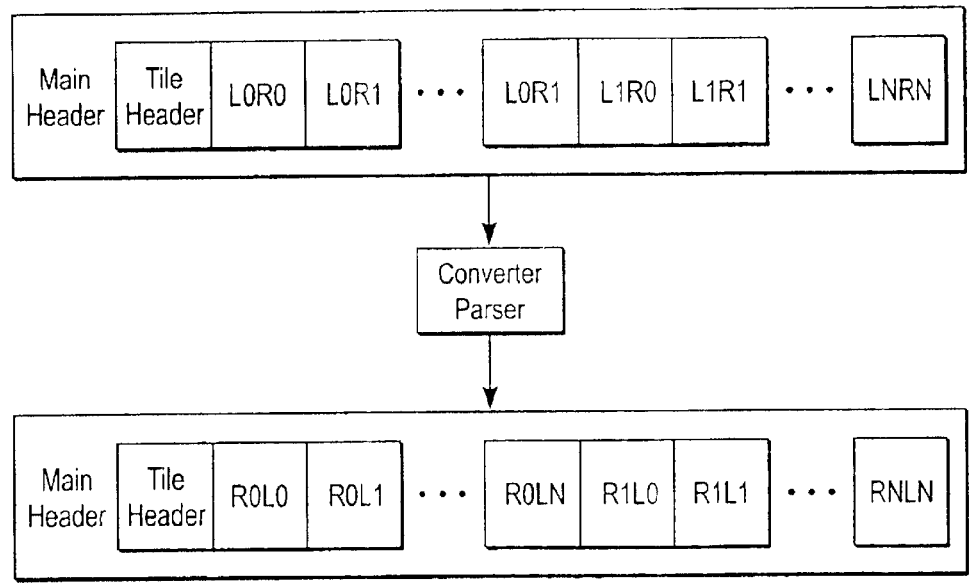
FIG. 6B illustrates a progression converter converting from a resolution progressive codestream to a quality progressive codestream.

FIG. 6B illustrates the progression converter converting from a layer progressive codestream (LRCP) to a resolution progressive (RLCP) codestream. The progression orders map directly to each other.

Figure 7A:
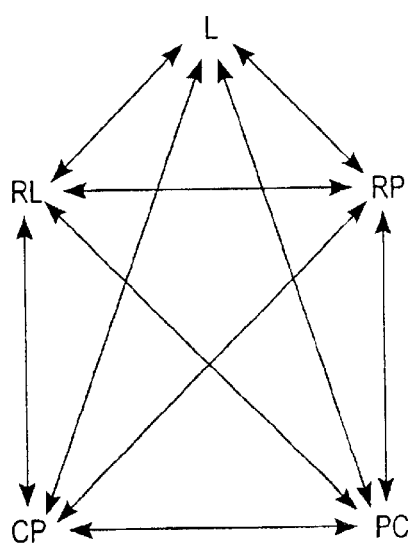
FIG. 7A shows multiple ways to convert a codestream from one progression order to another.
Figure 7B:
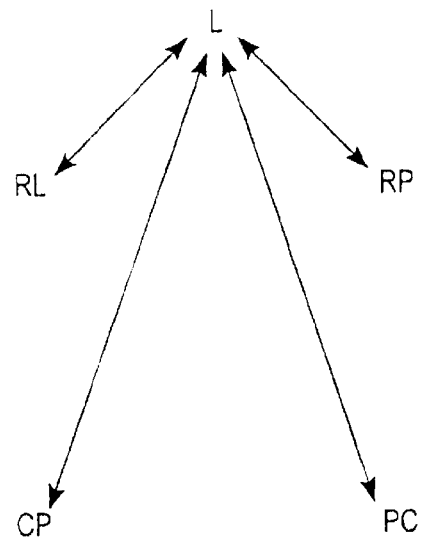
FIG. 7B shows one embodiment of simplified conversion paths to convert a codestream from one progression order to another.

FIG. 7A shows multiple ways to convert a codestream from one progression order to another. Referring to FIG. 7A, each of the five progressions (LRCP, RLCP, RPCL, CPRL, and PCRL) are shown with paths to each of the others, such that all progressions are shown. In one embodiment, the parser causes all conversions to go through the layer progression first and then to a selected conversion. FIG. 7B shows one embodiment of such simplified conversion paths in which the number of required mappings is reduced from 10 (as in FIG. 7A) to 4. However, any one of the five progression orders could be used as the one to which all are converted before arriving at the selected order. The conversion technique described herein simplifies source codes in that the number of lines of source code is much less than the multiple ways of conversion. This results in less debug time and fewer memory and run-time variables.

To perform the conversion, the order of the packets in the codestream must be reordered. The packets are labeled by their sequential order in the codestream. Markers may indicate the starting point of the data, the length of the data (or alternatively the endpoint of the data) and how the data should be handled. For example, the indication of how the data is to be handled may indicate whether the data is to be deleted, whether the data is to be truncated, or some other operation to be performed on the data. Such handling information may also come from rate distortion information, such as may be provided in a PLT/PLM and/or the PPT/PPM marker sets of the JPEG 2000 standard. In this manner, the codestream may be truncated without changing the packet header.

In one embodiment, a list, array, or other structure (such as reordering structure 601A) is built by indicating the portion of data in each packet. Using this structure, the packets may be reordered.

Figure 8:
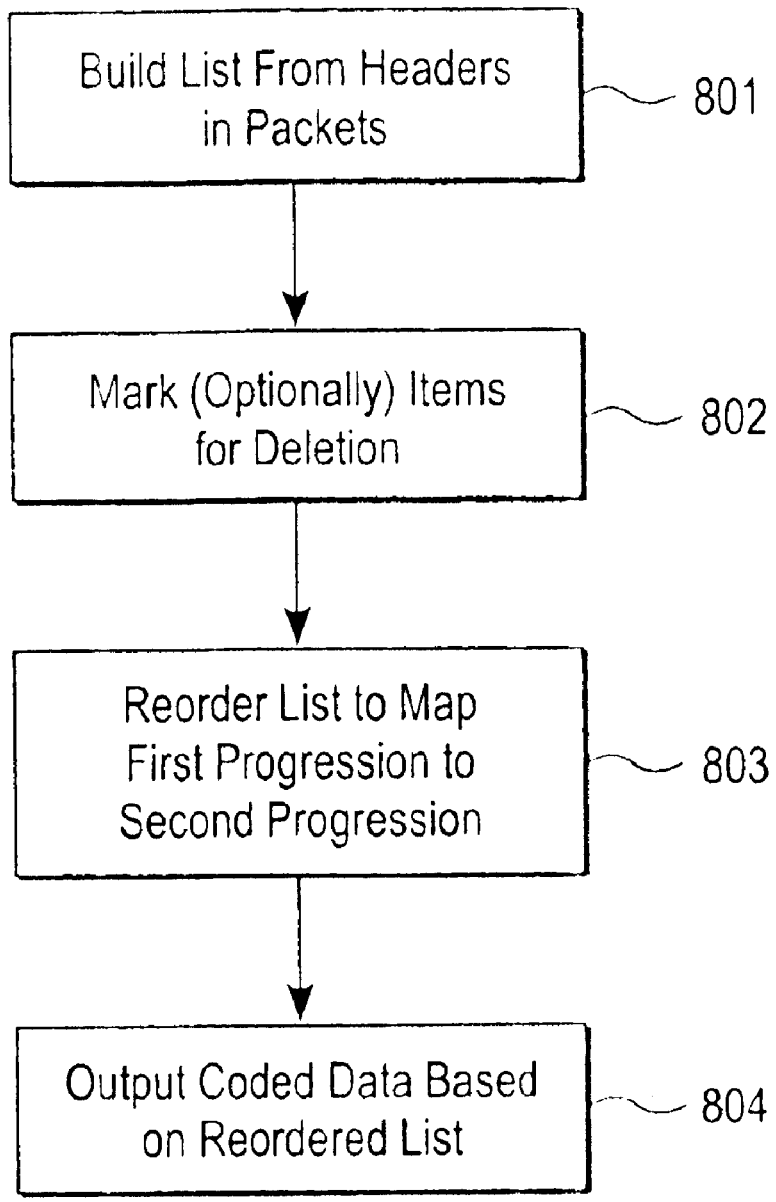
FIG. 8 illustrates one embodiment of a process for performing progression order conversion.

FIG. 8 illustrates one embodiment of a process for performing progression order conversion. The process is performed by processing logic that may comprise hardware (e.g., dedicated logic, circuitry, etc.), software (such as is run by, for example, a general purpose computer or dedicated machine), or a combination of both.

Referring to FIG. 8, the process begins by processing logic building a list from headers in the packets (processing block 801) and optionally marking list items "delete" for quantization (processing block 802). Next, processing logic reorders the list to map the original progression to a desired progression (including handling input and output with progressions specified with POC markers (bounds on the progression order) (processing block 803). Thereafter, processing logic outputs coded data based on reordered list (processing block 804).

Therefore, the combination of re-ordering and parsing allows specification of the desired ordering and resolution, quality, etc.

A Progression Order Conversion Example

The following is an example showing how packets are arranged in a codestream. The codestream was formed based on 2 components, 2 layers, 3 decomposition levels, and layer progression.

Table 4 shows the packet order, length and association index of packets in the example. The packet order column shows the sequential order of packets placed in a codestream. The length indicates the length of the packets. The association index shows the resolution, layer, component, and precinct of the packet.

For example, packet[0] is the first packet in the codestream after the first tile header. It has a length of 589 bytes. Association index RwLxCyPz indicates the packet belongs to resolution w, layer x, component y and precinct z.

TABLE 4

| Packet order | Length | Association Index |
|---|---|---|
| packet[0] | length = 589 | R0L0C0P0 |
| packet[1] | length = 589 | R0L0C1P0 |
| packet[2] | length = 924 | R1L0C0P0 |
| packet[3] | length = 924 | R1L0C1P0 |
| packet[4] | length = 1602 | R2L0C0P0 |
| packet[5] | length = 1602 | R2L0C1P0 |
| packet[6] | length = 733 | R3L0C0P0 |
| packet[7] | length = 733 | R3L0C1P0 |
| packet[8] | length = 535 | R0L1C0P0 |
| packet[9] | length = 535 | R0L1C1P0 |
| packet[10] | length = 1523 | R1L1C0P0 |
| packet[11] | length = 1523 | R1L1C1P0 |
| packet[12] | length = 5422 | R2L1C0P0 |
| packet[13] | length = 5422 | R2L1C1P0 |
| packet[14] | length = 16468 | R3L1C0P0 |
| packet[15] | length = 16468 | R3L1C1P0 |

In this codestream, packets are grouped based on the layer in which they reside. The first 8 packets belong to Layer 0. The following 8 packets belong to Layer 1.

Using the conversion process described herein, the above codestream is converted to resolution layer progression. The following shows how the above packets are re-ordered.

After the layer progressive codestream is converted to resolution progression, in the new codestream, packets are grouped based on resolution. Such a grouping is shown in Table 5. The first 4 packets belong to the resolution 0, the next 4 packets to resolution 1, and so on.

TABLE 5

| Previous Packet order | Packet order | Length | Association Index |
|---|---|---|---|
| 0 | packet[0] | length = 589 | R0L0C0P0 |
| 1 | packet[1] | length = 589 | R0L0C1P0 |
| 8 | packet[2] | length = 535 | R0L1C0P0 |
| 9 | packet[3] | length = 535 | R0L1C1P0 |
| 2 | packet[4] | length = 924 | R1L0C0P0 |
| 3 | packet[5] | length = 924 | R1L0C1P0 |
| 10 | packet[6] | length = 1523 | R1L1C0P0 |
| 11 | packet[7] | length = 1523 | R1L1C1P0 |
| 4 | packet[8] | length = 1602 | R2L0C0P0 |
| 5 | packet[9] | length = 1602 | R2L0C1P0 |
| 12 | packet[10] | length = 5422 | R2L1C0P0 |
| 13 | packet[11] | length = 5422 | R2L1C1P0 |
| 6 | packet[12] | length = 733 | R3L0C0P0 |
| 7 | packet[13] | length = 733 | R3L0C1P0 |
| 14 | packet[14] | length = 16468 | R3L1C0P0 |
| 15 | packet[15] | length = 16468 | R3L1C1P0 |

One Embodiment of a Conversion Algorithm

Resolution to Layer Progression

```
n = 0;
for(l=0;1<layer;l++){
    for(r=0;r<resolution+1;r++){
        for(c=0;c<component;c++){
            new_packet[n]= old_packet[1*component + r*layer*component + c];   n++;
        }
    }
}
```

Layer to Resolution Progression

```
n = 0;
for(r=0;r<resolution+1;r++){
    for(l=0;1<layer;l++){
        for(c=0;c<component;c++){
            new_packet[n]= old_packet[r*component +
                1*(resolution+1)*component + c];
            n++;
        }
    }
}
``` where layer = the number of layers in a codestream,
resolution = the number of decomposition levels in a codestream, and
component = the number of components in a codestream Data Hiding (Sideband Information) in JPEG2000 Coding Bit hiding allows sideband information to be transmitted without increasing the file size. Sideband information that does increase file size but does not break naive decoders might also be valuable (although the COM marker defined by the JPEG 2000 standard might be used instead).

Some marker segments, packet headers and packets are padded out to the nearest byte. Examples of the JPEG 2000 marker segments include PPM, PPT, PLM, and PLT. In addition, some marker segments can be longer than they need to be including QCD, QCC, and POC. In all of these cases, the padded data values are not defined.

Several proprietary coding schemes could use this semi-randomly located undefined data to provide a number of important types of information including, but not limited to, decoding and filtering hints, ownership, segmentation hints, and so on. A hint might include an index to a particular enhancement scheme. For example, if it is known that an image is mostly text, a value may be sent that indicates that a first post-processing filter is to be used. On the other hand, if the area is mostly a graphic image, then a value may be sent that indicates that a second post-processing filter is to be used.

The following are places where bits may be hidden or sideband information may be stored in the codestream.
- arithmetic coder (AC) termination (without predictable termination)
- end of packet header rounding to byte
- after last packet, before next tile
- tag tree construction by not always using minimum
- packet header Lblock signalling
- LSB parity for codeblocks (refinement pass only, cleanup pass only, all)
- QCD, QCC extra subbands, POC.

For example, with respect to hiding data using AC termination, 0 to 7 bits are provided, at least, everytime the coder is terminated. However, this could be extended for a few bytes. These extra bits and bytes may be used for sending extra information.

With respect to each packet header, the end of a packet header is rounded to a byte boundary. Therefore, there may be 1 to 7 bits that may be available for sending extra information at times when rounding would have been necessary. Similarly, each packet is rounded to a byte boundary, thereby providing 1 to 7 bits (assuming that rounding would have been necessary). Also the last packet in a tile-part can be extended a few bytes. These extra bytes may be used to send additional information.

The length of the compressed data for a code-block can be given in the packet header with a non-minimum representation. The choice of representation (e.g., a non-minimum representation) could be used for indicating other information.

With respect to tag tree data hiding, packet headers of the JPEG 2000 standard use tag trees for coding first inclusion and zero bitplane information. When there are multiple codeblocks, tag trees are like a quadtree of minimum values. For example, in the case of 16 codeblocks in a 4×4 arrangement in a packet, the arrangement may be as follows:

```
10  7 12 15
 3 20 21  5
81 45  5  9
18  8 12 24
```

An example tag tree, which is minimal for the 4×4 arrangement above is as follows:

```
3 0 2  7  4  7 10
  5 2  0 17 16  0
       73 37  0  4
       10  0  7 19
``` in which "3" is added to every codeblock's value, and "0", "2", "5" and "2" are each added to the 4 corresponding codeblocks. Finally, there is one value per codeblock. That is, the minimal tag tree is created by taking the first 2×2 group in the 4×4 arrangement above and look at minimum value is out of the four values. In this case, for the 2×2 block

```
10  7
 3 20
``` the minimum value is 3. This is then performed on the other 2×2 blocks. Then these identified minimum values are evaluated again to determine their minimum, which would be "3" in the example. Then the minimum value is subtracted from the four minimum values to create the following

```
0 2
5 2
```

Then, for the remaining numbers in the 4×4, the number 3 is subtracted from each value along with the value in the 2×2 that corresponds to the particular value in the 4×4 arrangement, thereby resulting in the tag tree above.

The first row adds up as follows:

10=3+0+7

7=3+0+4

12=3+2+7

15=3+2+10

A variable length code may be used that efficiently represents small numbers.

An example of a tag tree that is not minimal is as follows:

```
2 1 3  7  4  7 10
  6 3  0 17 16  0
       73 37  0  4
       10  0  7 19
```

(Note that representing "3", "0", "2", "5" and "2" might use less bitstream data than "2", "1", "3", "6" and "3".)

Once a tag tree representation has been made, a determination can be made as to whether the representation is minimal or not based on whether there is a zero in the 2×2 block. Therefore, this information is hidden. For example, the 1 bit block represents the 1 in the 2×2 block above indicates it is not part of a minimal tag tree, but can be used to convey some particular information to a decoder. Likewise if a 2 was the minimal value in the 2×2 block, such a fact may convey different information to a decoder.

The JPEG 2000 POC, QCD, and QCC markers can have redundant entries. It is as if the codestream were quantized and the markers were not rewritten. For example, the QCD and QCC markers have values for a number of subbands specified by the syntax of the marker. If there are fewer subbands actually coded in the bitstream, data may be hidden in the values used for the missing subbands. The redundant entries may be replaced and used for hidden or sideband information.

The hidden or sideband information may include post-processing hints (such as, for example, sharpen this tile with a specified filter or strength, or smooth, or perform optical character recognition (OCR) on this region, etc.), decoding hints, security (such as, for example, an encryption key for decoding the remainder of the image or another image, etc.) codestream identification (such as, for example, labeling POTUS as the originator of the file, etc.) and/or other information.

Use of Layers When Encoding

Layers are part of the JPEG standard. In one embodiment, sideband information, possibly in a COM marker, is used by the decoder to allow selecting of layers during decoding. The sideband information may be used to select layers for postcompression quantization to meet rate/distortion targets for different viewing distances, different resolutions, different regions of interest, different frequency content for analysis (e.g., finding edges of text).

In one embodiment, the layers are predefined based on rate. For example, the first layer represents a 1-bit per pixel image, while the second layer represents a 2-bit per pixel image, etc. Therefore, the layers run from the lowest quality to the highest quality. Likewise, target rates can be met for lower resolutions as well.

The sideband information may be stored in a marker segment of the codestream. In one embodiment, the JPEG 2000 comment (COM) marker is used to provide information about the layers. Specifically, the COM marker may be used to indicate the number of bytes for each resolution and/or rate across the entire image or a relative number of bytes for each additional layer. Table 6 indicates each layer and its resolution in the number of bytes across the tile in an image. Such a table may have distortion values instead.

TABLE 6

| | | | |
|---|---|---|---|
| lev = 0 | layer = 0 | comp = 0 | bytes = 529 |
| lev = 0 | layer = 0 | comp = 1 | bytes = 555 |

TABLE 6-continued

| | | | |
|---|---|---|---|
| lev = 0 | layer = 0 | comp = 2 | bytes = 493 |
| lev = 0 | layer = 1 | comp = 0 | bytes = 129 |
| lev = 0 | layer = 1 | comp = 1 | bytes = 130 |
| lev = 0 | layer = 1 | comp = 2 | bytes = 123 |
| lev = 0 | layer = 2 | comp = 0 | bytes = 7 |
| lev = 0 | layer = 2 | comp = 1 | bytes = 8 |
| lev = 0 | layer = 2 | comp = 2 | bytes = 12 |
| lev = 0 | layer = 3 | comp = 0 | bytes = 1 |
| lev = 0 | layer = 3 | comp = 1 | bytes = 1 |
| lev = 0 | layer = 3 | comp = 2 | bytes = 129 |
| lev = 1 | layer = 0 | comp = 0 | bytes = 705 |
| lev = 1 | layer = 0 | comp = 1 | bytes = 898 |
| lev = 1 | layer = 0 | comp = 2 | bytes = 712 |
| lev = 1 | layer = 1 | comp = 0 | bytes = 146 |
| lev = 1 | layer = 1 | comp = 1 | bytes = 114 |
| lev = 1 | layer = 1 | comp = 2 | bytes = 116 |
| lev = 1 | layer = 2 | comp = 0 | bytes = 224 |
| lev = 1 | layer = 2 | comp = 1 | bytes = 250 |
| lev = 1 | layer = 2 | comp = 2 | bytes = 263 |
| lev = 1 | layer = 3 | comp = 0 | bytes = 201 |
| lev = 1 | layer = 3 | comp = 1 | bytes = 212 |
| lev = 1 | layer = 3 | comp = 2 | bytes = 200 |
| lev = 2 | layer = 0 | comp = 0 | bytes = 889 |
| lev = 2 | layer = 0 | comp = 1 | bytes = 1332 |
| lev = 2 | layer = 0 | comp = 2 | bytes = 1048 |
| lev = 2 | layer = 1 | comp = 0 | bytes = 240 |
| lev = 2 | layer = 1 | comp = 1 | bytes = 329 |
| lev = 2 | layer = 1 | comp = 2 | bytes = 328 |
| lev = 2 | layer = 2 | comp = 0 | bytes = 599 |
| lev = 2 | layer = 2 | comp = 1 | bytes = 767 |
| lev = 2 | layer = 2 | comp = 2 | bytes = 725 |
| lev = 2 | layer = 3 | comp = 0 | bytes = 335 |
| lev = 2 | layer = 3 | comp = 1 | bytes = 396 |
| lev = 2 | layer = 3 | comp = 2 | bytes = 420 |
| lev = 3 | layer = 0 | comp = 0 | bytes = 1 |
| lev = 3 | layer = 0 | comp = 1 | bytes = 395 |
| lev = 3 | layer = 0 | comp = 2 | bytes = 402 |
| lev = 3 | layer = 1 | comp = 0 | bytes = 251 |
| lev = 3 | layer = 1 | comp = 1 | bytes = 450 |
| lev = 3 | layer = 1 | comp = 2 | bytes = 562 |
| lev = 3 | layer = 2 | comp = 0 | bytes = 525 |
| lev = 3 | layer = 2 | comp = 1 | bytes = 990 |
| lev = 3 | layer = 2 | comp = 2 | bytes = 1313 |
| lev = 3 | layer = 3 | comp = 0 | bytes = 1214 |
| lev = 3 | layer = 3 | comp = 1 | bytes = 1798 |
| lev = 3 | layer = 3 | comp = 2 | bytes = 2585 |

In another embodiment, the ordering could be by layer. Thus, the information above is consolidated for each level (not segregated by level or component), as shown below:
Ordering by layer=0 bytes=7959 bitrate=0.971558 PSNR=30.7785
Ordering by layer=1 bytes=10877 bitrate=1.327759 PSNR=32.0779
Ordering by layer=2 bytes=16560 bitrate=2.021484 PSNR=35.7321

Distortion by layers can be based on PSNR. For example,
layer=0 PSNR=30.7785
layer=1 PSNR=32.0779
layer=2 PSNR=35.7321

In an alternative embodiment, such information may be hidden in the codestream as described above. The information may be used to control rate distortion.

In another embodiment, the layers may be predefined for a particular viewing distance. In such a case, the data is divided into layers from the highest frequency, lowest resolution to the lowest frequency, highest resolution.

In one embodiment, the layer information indicates the summation of bits across the entire image for that layer and all previous layers (for example the 16,011 bits listed next to layer 1 indicates the total number of bits for layer 0 and layer 1). Alternatively, bytes, words, kilobytes, or other units of memory or rate could be used instead of bits. Table 7 shows this type of absolute rate information.

Table 8 shows relative rate information. Layer 0 has 4096 bits, layer 1 has 11,915 bits, etc.

TABLE 7

| layer | Rate (bytes) |
|---|---|
| 0 | 4,096 |
| 1 | 16,011 |
| 2 | 40,000 |
| 3 | 100,000 |
| 4 | 250,000 |
| 5 | 500,000 |
| 6 | 1,000,000 |
| 7 | 2,500,000 |
| 8 | 5,500,000 |

TABLE 8

| layer | Rate (bytes) |
|---|---|
| 0 | 4,096 |
| 1 | 11,915 |
| 2 | 23,989 |
| 3 | 60,000 |
| 4 | 150,000 |
| 5 | 250,000 |
| 6 | 500,000 |
| 7 | 1,500,000 |
| 8 | 3,000,000 |

For example, if only 750,000 bytes may be allowed in the decoded image, then all that can be decoded (as the 1,000,000 bytes tabulated with layer 6 includes the 500,000 bytes of layers 0–5) is through layer 5 and half of importance layer 6. In some embodiments, no packets from layer 6 would be included. In other embodiments, some packets from layer 6 would be included and others would be replaced by zero packets so that the total amount of layer 6 data was approximately 250,000 bytes.

FIG. 22 illustrates an example of layering for a 5,3 irreversible transform with three levels, MSE or similar. Referring to FIG. 22, there are 45 layers shown. Each additional layer improves MSE in an order that gives good rate-distortion for MSE.

FIG. 23 illustrates another example in which transform has 5 levels and the data is divided up into layers 0–3. Layer 0 corresponds to the thumbnail version, layers 0–1 correspond to the monitor (or screen) resolution, layers 0–2 correspond to the print resolution, and layers 0–3 correspond to lossless.

Figure 9:
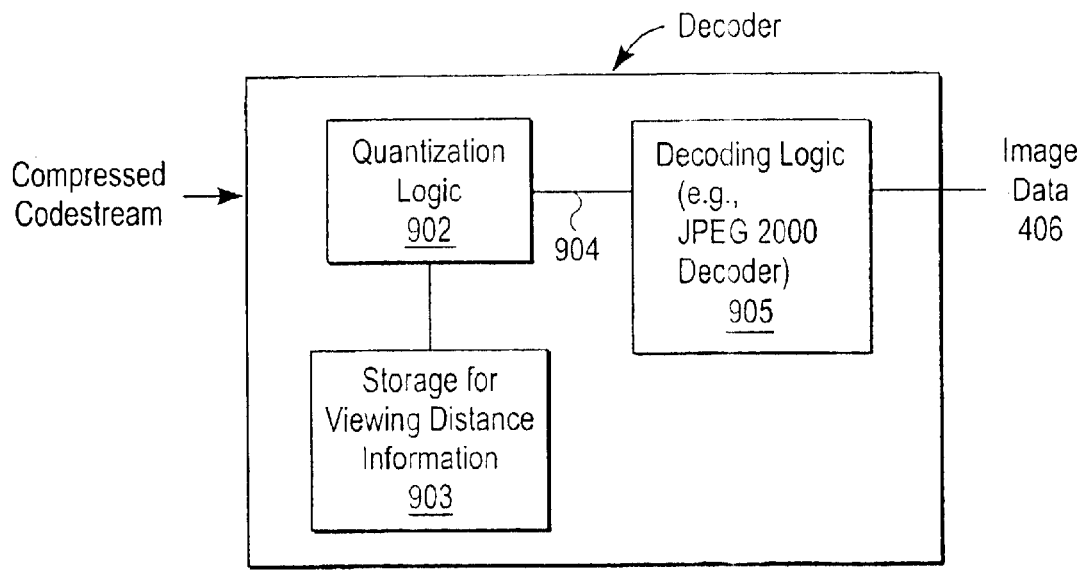
FIG. 9 illustrates a decoder that selects portions of a codestream based on sideband information.

In an alternative embodiment, the layers may be predefined for some other distortion metric (e.g., MSE, weighted MSE, sharpness of text, etc.) The decoder uses the information regarding the layers from the codestream to select layers to generate an image. The decoder knowing what the desired viewing characteristics from the application or implementation (see Table 9 below), and using the information from the codestream specifying the layers, can quantize the codestream in order to display an image at the correct viewing distance. FIG. 9 illustrates such a decoder. Referring to FIG. 9, decoder 901 receives a codestream and includes quantization logic 902 that examines the COM marker and uses information about the viewing distance it is at stored in storage 903 to generate quantized codestream 904 via, for example, selecting the proper layers. Quantized codestream 904 is decoded by decoding logic 905 (e.g., a JPEG 2000 decoder) after selecting layers to generate an image data 906. A naive decoder would simply ignore the data in the comment marker.

Figure 10:
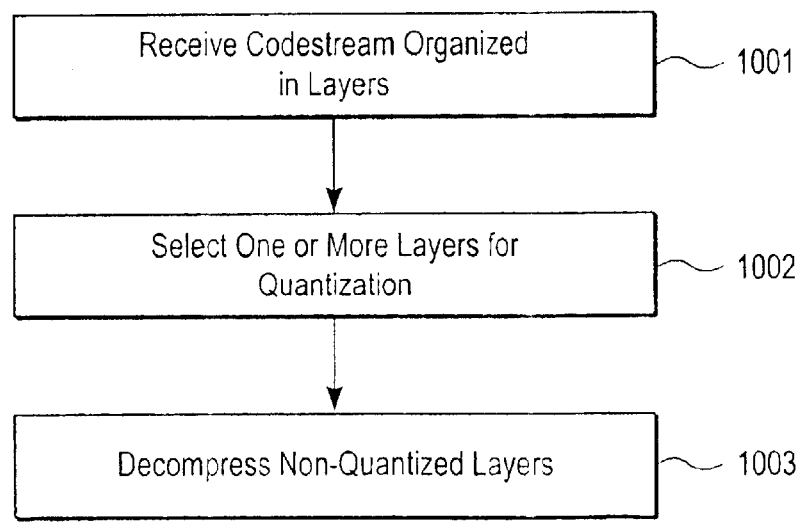
FIG. 10 is a flow diagram of a process for using layers when decoding.

FIG. 10 is a flow diagram of a process for using layers when decoding. The process is performed by processing logic that may comprise hardware (e.g., dedicated logic, circuitry, etc.), software (such as is run by, for example, a general purpose computer or a dedicated machine), or a combination of both.

Referring to FIG. 10, the process begins by processing logic receiving a codestream of compressed logic data (processing block 1001). The image data is organized into multiple layers, each of which comprises coded data that adds visual value to the image (e.g., look sharper, better defined, better contrast, etc.). Next processing logic selects one or more layers for quantization based on sideband information (processing block 1002). After selection, processing logic decompresses the non-quantized layers of the codestream (processing block 1003).

Editing of Tiles, Tile-parts, or Packets

Once a codestream is created, it may be desirable to edit parts of the image. That is, for example, after performing encoding to create the codestream, a set of tiles may be decoded. After decoding the set of times, editing may be performed, followed by encoding the set of tiles with the edits to the same size as the encoded tiles were prior to their decoding. Examples of typical editing include sharpening of text and removing "red-eye." The JPEG 2000 codestream can be edited in memory or in a disk file system without rewriting the entire codestream.

Figure 11:
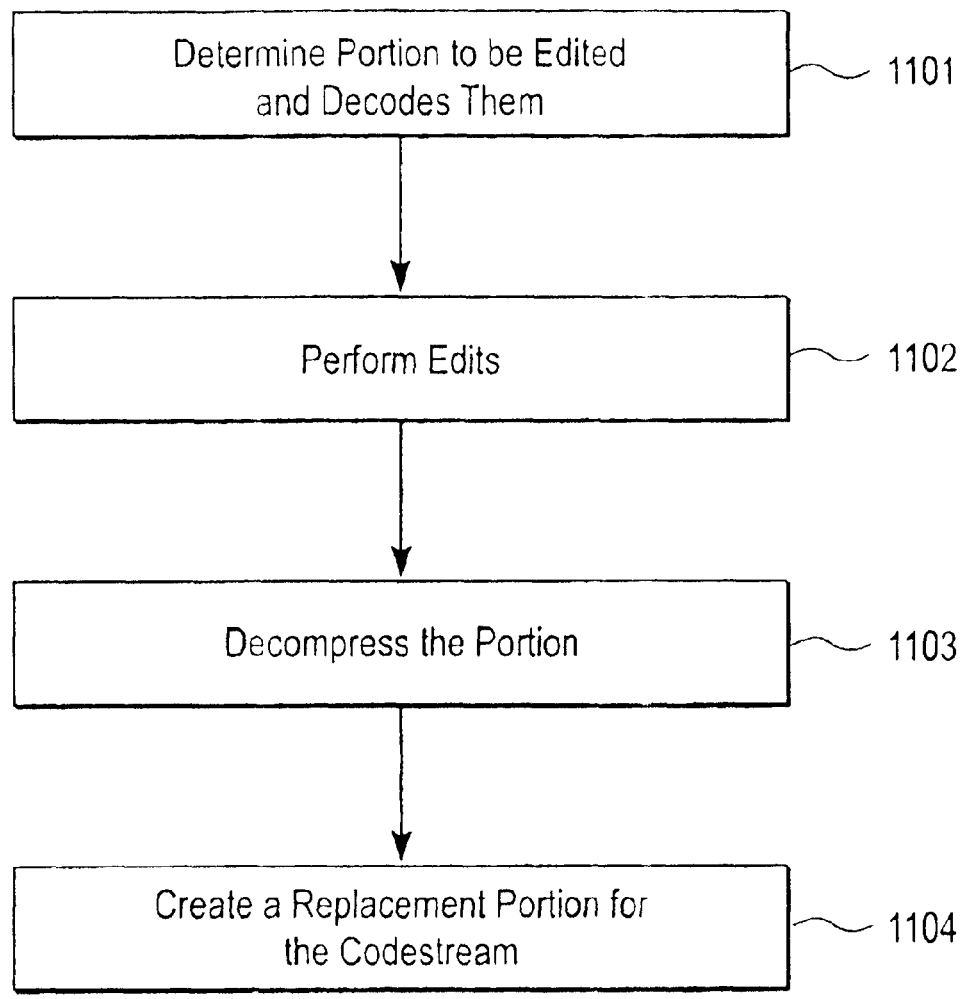
FIG. 11 is a flow diagram of one embodiment of an editing process.

FIG. 11 is a flow diagram of one embodiment of an editing process. The process is performed by process logic that may comprise hardware (e.g., dedicated logic, circuitry, etc.), software (such as is run by, for example, a general purpose computer or a dedicated machine), or a combination of both.

Referring to FIG. 11, processing logic initially determines the tiles, tile-parts, or packets that cover the area, resolution, components, and/or precincts to be edited and decodes them (processing block 1101). This determination may be made in response to a user selecting an area and/or working resolution. The determination may use editing information for a higher resolution to determine which parts or tiles cover the portion to be edited. Once decoding has been completed, processing logic performs the desired edits (processing block 1102).

After performing the desired edits, processing logic recompresses the data into coded data (processing block 1103) and creates a replacement tile, tile-part, or packet for the codestream (processing block 1104). In one embodiment, in creating the replacement tile, tile-part, or packet, processing logic pads out the data with bytes at the end of the codestream if the new data is smaller than the unedited version of the data to make the replacement tile, tile-part or packet the same size as the unedited version.

In an alternative embodiment, processing logic may use a marker, or tag, such as a COM marker segment of the appropriate length instead of the padding. The COM marker could be used to fill space or could contain information that the encoder wanted to include. It could contain information such as, for example, sideband information described herein or a copyright license for an image or text or other file format information.

In one embodiment, in creating the replacement tile, tile-part, or packet, processing logic truncates the last packets for any or all components until the data fits in the codestream if the new data is larger than the unedited version of the data.

Editing of an image may be performed by changing coded data for tiles, tile-parts, or codeblocks. In one embodiment, editing is performed without changing file size by quantizing instead of expanding. In another embodiment, a predetermined amount of extra space is allocated per tile or per codeblock to allow for a predetermined amount of expansion. In still another embodiment, coded data may be put at end of files by manipulating tile headers and putting invalid tile data in COM markers.

Note that if there are subsequent tile-parts that depend on the data in the portion of the codestream that is being edited, these tile-parts may become useless in the codestream. An indication of this useless data may be noted to the decoder by one of several methods. These methods involve inserting or modifying information in the codestream to indicate the presence and/or location of the useless data. In one embodiment, the application uses a status buffer to indicate that the data in tile-parts subsequent to an edited tile-part may be useless. The status buffer may be in workspace memory and describes dependencies between packets. If an earlier packet is altered, the subsequent packets cannot be decoded as is. These subsequent packets must be edited accordingly or eliminated. In another embodiment, such an indication may be made by zeroing out the data section of those tile-parts and/or creating a PPT marker segment that denotes no data.

Optimal Encoder Quantization

During encoding, unquantized coefficients from some or all subbands may be divided by a value of Q to create the quantized coefficient values. This value Q may have a wide range of values. Typical encoders quantize a number of the values in a single particular range of values is made equal to one single coefficient value. In essence, all the coefficients in the particular range are quantized to the same value. This can be exemplified by FIG. 12 which shows that the range of values is often in a bell shaped curve and that all of the values in the particular range, such as range $R_1$ are sent to the decoder as one quantized value, such as $R_1$, and the decoder will reconstruct these values to a particular value. Assume a decoder reconstructs these values to a predetermined value (e.g., floor (½ min+½ max), or min+½ Q, where Q is the quantization step size). For example, if the range of values is between 16 and 31, then the decoder may assume the value is 24. In one embodiment, instead of using ½ as the value, another value is selected, such as floor (⅜ min+⅝ max), or min+⅜Q, where Q is the quantization step size. Therefore, if the range is from 16 to 31, then it is assumed that the decoder will reconstruct the value to 22, instead of 24.

Figure 12:
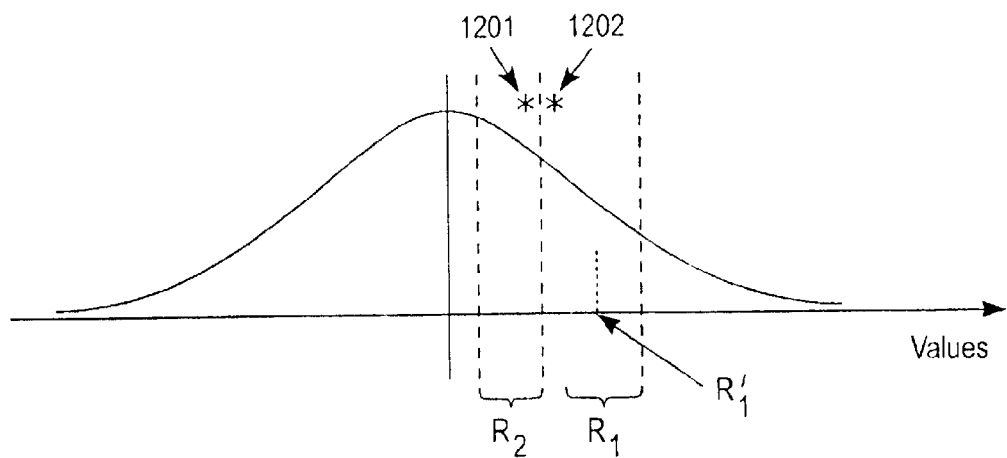
FIG. 12 illustrates a bell-shaped curve of a range of values that are quantized to a particular value.

In some cases, two spatially adjacent coefficients may be close to each other numerically yet in separate quantization bins, such as coefficient values 1201 of range $R_2$ and 1202 of range $R_1$ in FIG. 12. The results of the quantization may cause an artifact to occur. In one embodiment, for coefficients near a boundary between two quantization bins, the encoder selects a bin such as Range $R_1$ into which a coefficient, such as coefficient 1201, will be quantized so that it is consistent with neighbors, such as coefficient 1202. This helps avoid artifacts. That is, this technique reduces distortion yet may increase rate, particularly when a coefficient is moved from a smaller bin to a higher bin.

Flicker Reduction for Motion JPEG

At times, flicker occurs when applying wavelet compression to motion sequences. An example of such flicker may include the image getting brighter or darker in areas or the appearance of edges changing in successive frames as the motion sequence is played (mosquito noise around the edges). The flicker may be due to the application of different local quantization to successive frames of a motion sequence or to noise exacerbated by quantization that is viewed temporally.

Figure 13:
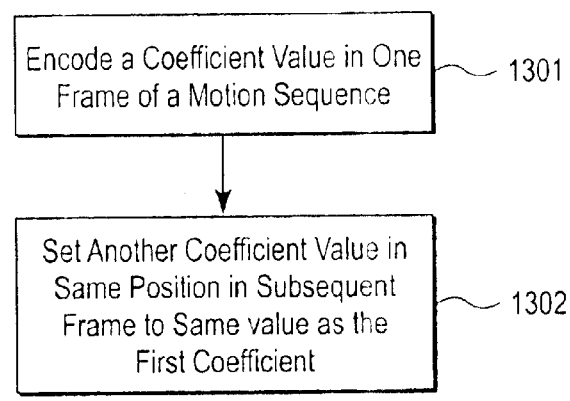
FIG. 13 is a flow diagram of one embodiment of a process to reduce flicker.

To reduce flicker, coefficients that are in the same position and close to the same value in successive frames are forced to the same value. That is, the coefficients values in successive frames are set to a predetermined value. This is essentially a form of quantization that is applied during encoding. FIG. 13 is a flow diagram of one embodiment of a process to reduce flicker.

A test of whether to apply such quantization to a coefficient value in a subsequent frame is based on the quantization that was performed on the coefficient in the previous frame. Thus, the encoder is utilizing frame dependency to eliminate flicker while the decoder decodes data frame by frame independently.

In one embodiment, in order to reduce flicker in motion JPEG, coefficient values are modified (quantized) based on their relationship with each other with respect to a threshold. For example, if Dn and Dn+1 are the corresponding coefficient (same spatial location and same subband) in two frames before quantization, if D'n and D'n+1 represent these coefficients after quantization, if Q($\cdot$) are scalar quantization, and if the value T is a threshold, then the following may be applied:

if $(|Q(Dn+1)-(D'n)|<T)$
   D'n+1=D'n
else
   D'n+1=Q(Dn+1)

For example, the value T may be twice the quantization step size. Other values of T include, but are not limited to, $\sqrt{2}Q$, 1.5Q, $2\sqrt{2}Q$.

One of the coefficient values may be modified to be either a predetermined closeness to another coefficient value. The closeness may be determined by some threshold. The threshold may be user set or adaptive based on some criteria. The threshold could be different based on the subband and, perhaps, on the persistance of the particular value (number of frames that this coefficient is close). In one embodiment, the coefficient value is set equal to the other coefficient value. In alternative embodiments, the coefficient is set to be within the quantization bin size of the other coefficient value or twice the quantization bin size.

Figure 14:
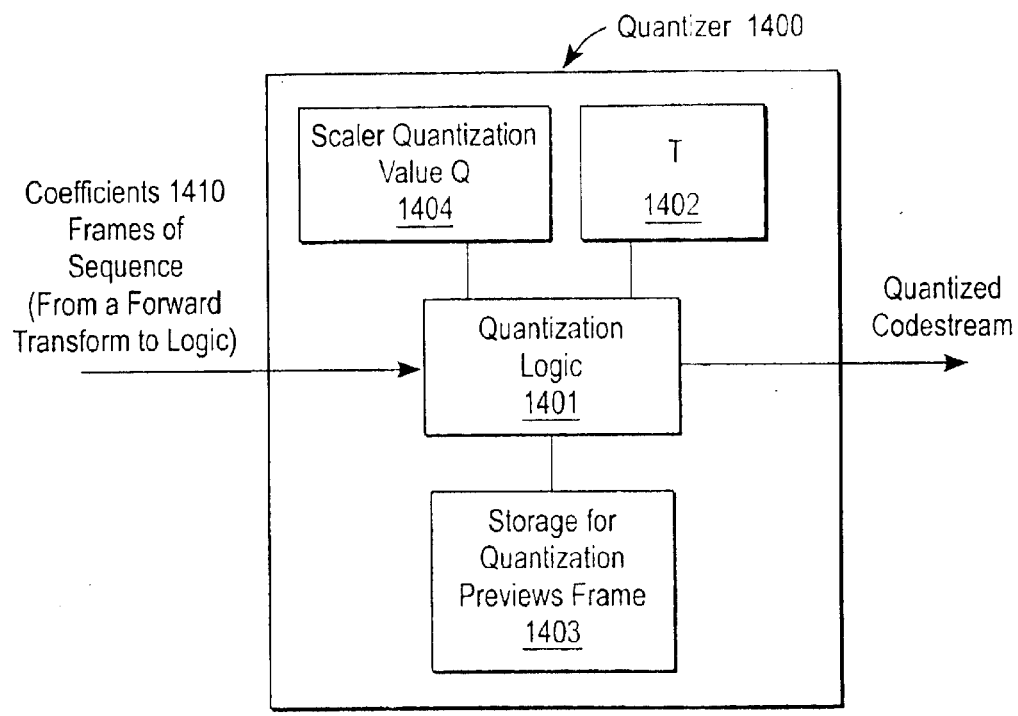
FIG. 14 illustrates one embodiment of an encoder (or portion thereof) that performs the quantization to reduce flicker.

FIG. 14 illustrates one embodiment of an encoder (or portion thereof that performs the quantization described above. Referring to FIG. 14, a quantizer 1400 receives coefficients 1410 for frames of a motion sequence from a wavelet transform (not shown). The coefficients are received by quantization logic 1401 which compares a threshold value stored in memory 1401 to coefficient values for the previous frame that are stored in memory 1403 to coefficients 1410 with a scalar quantizer Q applied from memory 1404.

Figure 24:
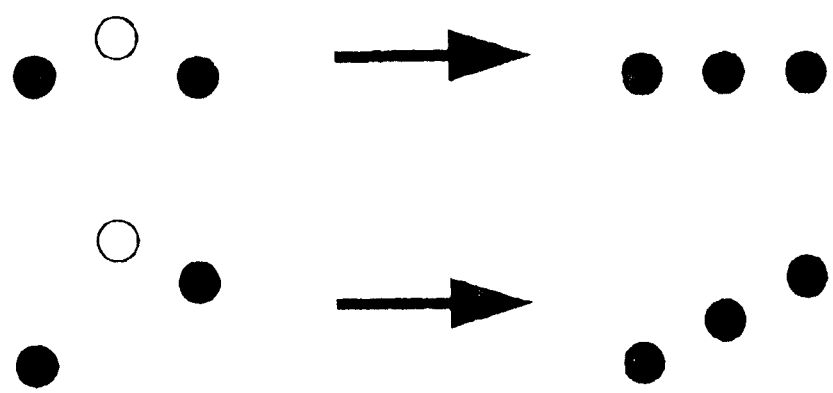
FIG. 24 illustrates one example of a situation in which flicker may be avoided in which values in first and third frames are used to set the value in the second frame.

Quantization logic 1401 may comprise comparison hardware (e.g., logic with gates, circuitry, etc.) or software to perform the comparison. This comparison hardware and software may implement a subtractor or subtraction operation. The results are a quantized codesteam (assuming some values have been changed.) This may be applied over two or more frames. Also the comparison is not limited to two consecutive frames. The comparison can be over 3, 4, 5, etc., frames, for example, to determine if a variance exists. FIG. 24 illustrates one example in which values in a first and third frame are used to set the value in the second frame.

Note that the quantization can also be codestream quantization with a code block-based rule.

Rate Control, Quantization, and Layering

In one embodiment, selective quantization of coefficients can be performed during encoding by setting a subset of the refinement bits to be the more probable symbol (MPS). This may be performed at a user selected bitplane. For examples, if there is text on a background image, with a goal of having sharp text images while minimizing coded data required for the background, the refinement bits that are set to MPS are those that do not effect text for the last bitplane, while using the actual value for bits that effect text.

Such a quantization scheme may be used to implement non-uniform quantization step sizes. For example, if one wanted to have a background with fewer bits, setting the refinement bits to the MPS could operate as a form of quantization. This quantization scheme causes some level of distortion but lowers the bit rate necessary to transfer the codestream.

Note that although this technique may be applied to bits generated during the refinement pass, the technique has application to other compression schemes (e.g., lists generated during subordinate passes, tail bits of CREW of Ricoh Silicon Valley, Menlo Park, Calif., MPEG IV texture mode, etc.).

In one embodiment, the same technique may be applied to other changes between frames. That is, in one embodiment, a change due to a rate distortion in one frame may be performed in a subsequent frame to avoid distortion effects.

Rate Control and Quantization

In one embodiment, user specified quantization is provided. For a 3 level transform for one component, 7 quantization values are sufficient: level 1 HH, level 1 HL and LH, level 2 HH, level 2 HL and LH, level 3 HH, level 3 HL and LH, and level 3 LH.

If quantization values are bitplanes to truncate (which is equivalent to scalar quantization by powers of 2), 3-bit values (0 . . . 7) are sufficient for most applications. (For image components with depth 12-bits or more and 5 or more transform levels, perhaps higher quantizations might be useful.) Values 0 . . . 6 could be used to specify the number of bitplanes to truncate and 7 could be used to mean discard all bitplanes. The three bit values may be written to a controller that controls compression (or decompression) hardware (e.g., JPEG2000 compatible hardware) to perform the quantization.

For 3 component color quantization:

21 values can be used with separate values for each component, 14 values can be used, 7 for luminance and 7 for chrominance, 17 values can be used for 4:1:1 subsampled data, 7 for luminance and 5 for each chrominance component, 12 values can be used for 4:1:1 subsampled data, 7 for luminance and 5 for chrominance, 19 values can be used for 4:2:2 subsampled data, 7 for luminance and 6 for each chrominance component, and 13 values can be used for 4:2:2 subsampled data, 7 for luminance and 6 for chrominance.

Since 21*3=63 bits is less than 8 bytes, transferring or storing the quantization uses little resources. A central processing unit (CPU) might select one predetermined quantizer from a table and write it to a CPU or other controller controlling special purpose JPEG 2000 hardware (a chip) for each frame of a motion JPEG 2000 video sequence. Alternatively, one implementation of JPEG 2000 might have a small memory that holds 8 or 16 different quantizers that could be selected for each frame.

Quantizers can also be used to assign bitplanes to layers. For example, $Q_0$, $Q_1$, and $Q_2$ may be quantizers that specify bitplanes of coding pass to quantize. Quantizer $Q_0$ causes the most loss, while quantizer $Q_2$ causes the least loss. Layer 1 is all the data quantized by $Q_0$ but not quantized by $Q_1$. Layer 2 is all the data quantized by $Q_1$ but not quantized by $Q_2$. Layer 3 is all the data quantized by $Q_2$.

Simple Quantization

Figure 17:
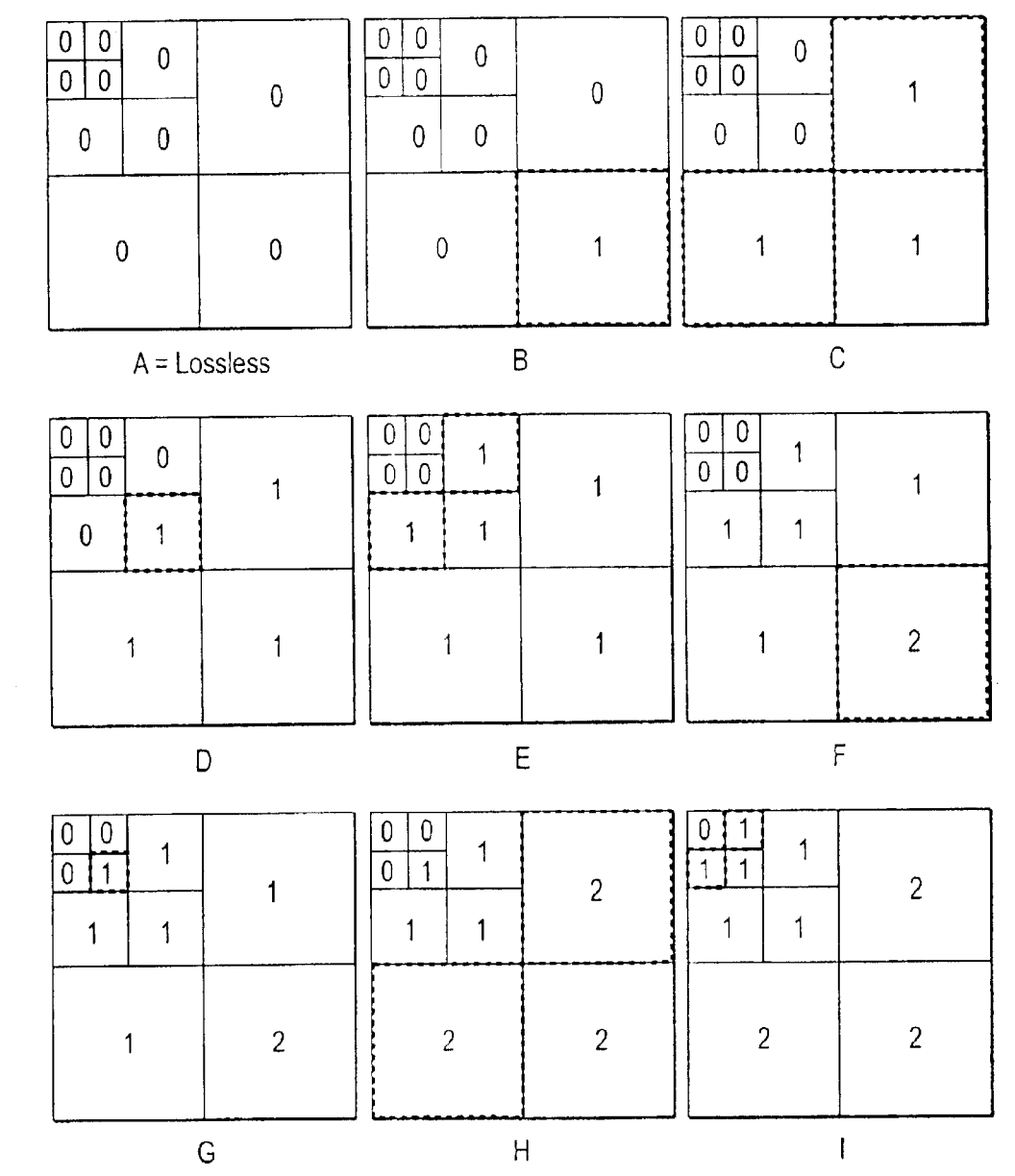
Figure 18:
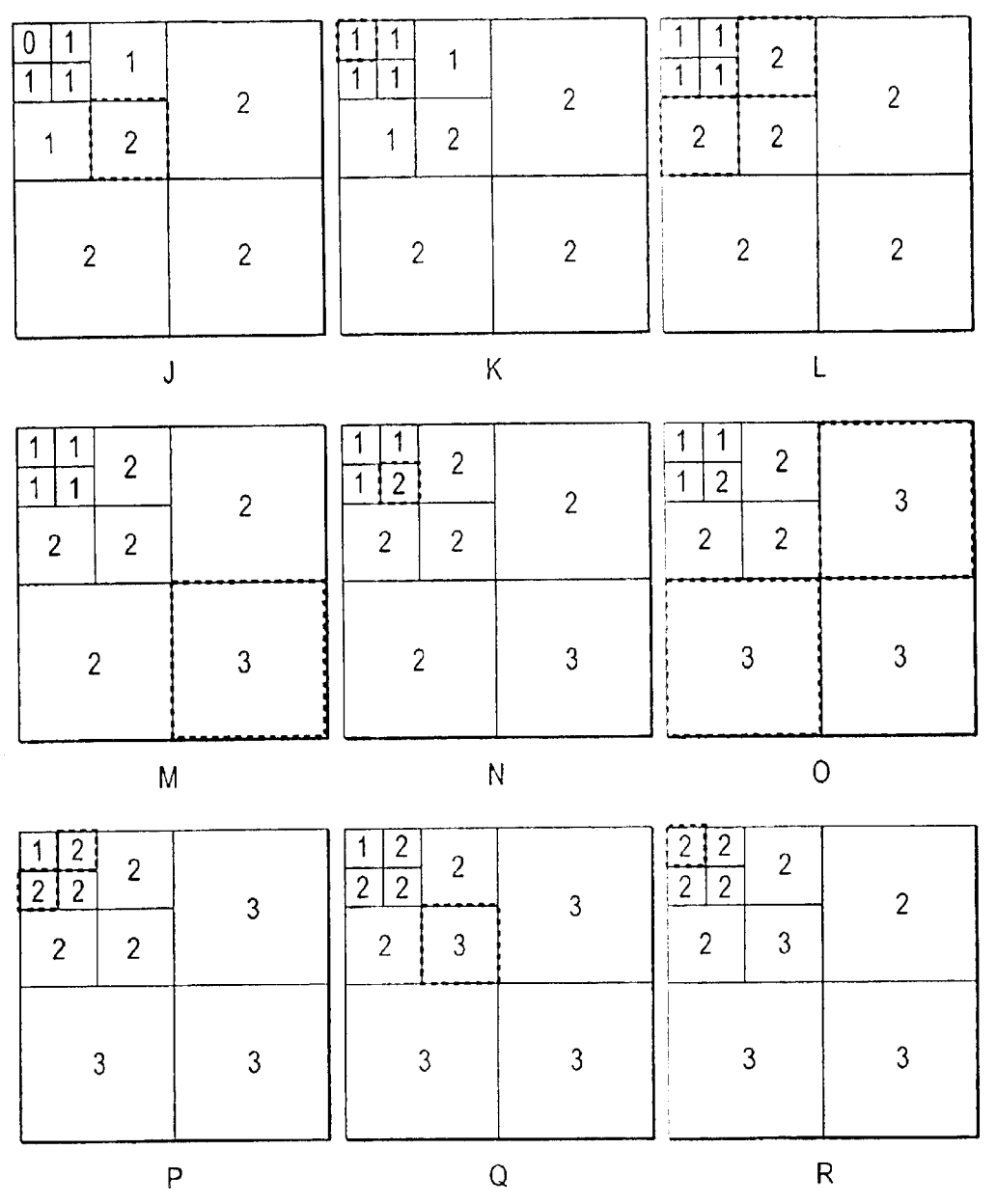

FIGS. 17 and 18 show example quantizers (label A . . . Q) for the 3-level 5/3 transform as the number of coefficient LSBs to truncate or not code. Truncating N bitplanes is equivalent to a scalar quantizer of $2^N$. The subband where the quantization changes with respect to the previous quantizer is highlighted with a dashed box. The quantizers D, K and Q all have the same relationship between the subbands. Other quantizers might be used that are better for MSE or for other distortion metrics.

The exemplary Verilog below converts a single quantization value "q" into seven quantizers (number of LSBs to truncate). The variable q_1_HH is used for level 1 HH coefficients, the variable q_1_H is used for level 1 HL and LH coefficients, etc. Some consecutive values of q result in the same quantizer: 0 and 1; 2 and 3; 4 and 5; 8i+6 and 8i+7 for all integers i with i≧0.

```
module makeQ(q, q_1HH, q_1H, q_2HH, q_2H,
q_3HH, q_3H, q_3LL);
  input [5:0] q;
  output [3:0] q_1HH;
  output [3:0] q_1H;
  output [3:0] q_2HH;
  output [2:0] q_2H;
  output [2:0] q_3HH;
  output [2:0] q_3H;
  output [2:0] q_3LL;
  wire [3:0] temp_2H;
  wire [3:0] temp_3HH;
  wire [3:0] temp_3H;
  wire [3:0] temp_3LL;
  wire [2:0] qlo;
  wire [2:0] qhi;
  assign qlo=q[2:0];
  assign qhi=q[5:3];
  assign q_1HH=qhi+((qlo>=2) ? 1:0);
  assign q_1H=qhi+((qlo>=4) ? 1:0);
  assign q_2HH=qhi+((qlo>=6) ? 1:0);
  assign temp_2H=qhi+((qlo>=1) ? 0:-1);
  assign temp_3HH=qhi+((qlo>=3) ? 0:-1);
  assign temp_3H=qhi+((qlo>=5) ? 0:-1);
  assign temp_3LL=qhi-1
  assign q_2H=(temp_2H<0) ? 0: temp_2H;
  assign q_3HH=(temp_3HH<0) ? 0: temp_3HH;
  assign q_3H=(temp_3H<0) ? 0: temp_3H;
  assign q_3LL=(temp_3LL<0) ? 0: temp_3LL;
endmodule
```

Human Visual System Weighting for Color and Frequency

Table 9 shows additional bitplanes to quantize (e.g., truncate) for luminance to take advantage of the frequency response of the Human Visual System (from Table J-2 of the JPEG 2000 standard). A viewing distance of 1000 pixels might be appropriate for viewing images on a computer monitor. Larger viewing distances might be appropriate for print images or television.

TABLE 9

Human Visual System Weighting for Luminance

| subband | extra biplanes to quantize for viewing distance of . . . | | |
|---|---|---|---|
|  | 1000 pixels | 2000 pixels | 4000 pixels |
| 1HH | 2 | 4 or 5 | discard all |
| 1HL, 1LH | 1 | 2 or 3 | 6 |
| 2HH | — | 2 | 4 or 5 |
| 2HL, 2LH | — | 1 | 2 or 3 |
| 3HH | — | — | 2 |
| 3HL, 3LH | — | — | 1 |

Additionally chrominance may be quantized more heavily than luminance.

Figure 19:
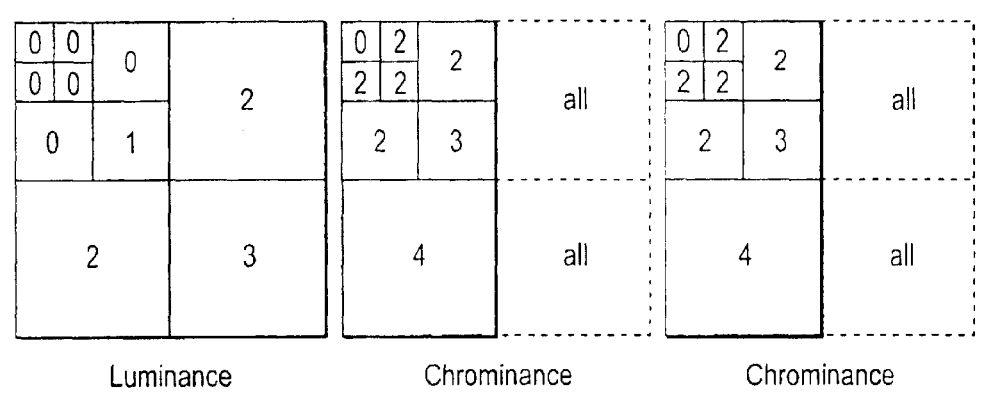

FIG. 19 shows a quantization that starts with FIG. 17(D) and then adds frequency weighting for a 1000 pixel viewing distance (to both luminance and chrominance), keeps 3LL chrominance unchanged, discards 1HL and 1HH chrominance for 4:2:2 and additional 2 bitplanes are discarded for the remaining chrominance.

Sharp text without ringing artifacts is more desirable than exact gray value for text/background. That is, if a gray level is supposed to be at 50% (for example), and is instead at 60%, it is often not visually objectionable if the image is of text. In one embodiment, the LL (DC) coefficients are quantized more heavily for text than for non-text images at low bitrate. For example, for an 8-bit image component, a quantiation step size of 8, 16 or 32 might be used for text only regions and a quantization step size of 1, 2 or 4 might be used for regions containing non-text. This allows more fidelity for the high frequency coefficients, thereby resulting in text with sharp edges.

Using Quantizers to Divide Things into Layers

Table 10 shows 16 example quantizers. Quantizer 15 is lossless. Quantizer 8 is the same as FIG. 19. These can be used divide the subband bitplanes into layers.

TABLE 10

| subband | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Y 1HH | all | all | 6 | 6 | 5 | 5 | 4 | 4 | 3 | 3 | 2 | 2 | 1 | 1 | 0 | 0 |
| Y 1HL,LH | 6 | 5 | 5 | 4 | 4 | 3 | 3 | 2 | 2 | 1 | 1 | 0 | 0 | 0 | 0 | 0 |
| Y 2HH | 5 | 4 | 4 | 3 | 3 | 2 | 2 | 1 | 1 | 0 | 0 | 0 | 0 | 0 | 0 | 0 |
| Y 2HL,LH | 4 | 4 | 3 | 3 | 2 | 2 | 1 | 1 | 0 | 0 | 0 | 0 | 0 | 0 | 0 | 0 |
| Y 3HH | 4 | 4 | 3 | 3 | 2 | 2 | 1 | 1 | 0 | 0 | 0 | 0 | 0 | 0 | 0 | 0 |
| Y 3HL,LH | 4 | 3 | 3 | 2 | 2 | 1 | 1 | 0 | 0 | 0 | 0 | 0 | 0 | 0 | 0 | 0 |
| Y 3LL | 0 | 0 | 0 | 0 | 0 | 0 | 0 | 0 | 0 | 0 | 0 | 0 | 0 | 0 | 0 | 0 |
| $C_1$ 1HH,HH | HL and HH always discarded for 4:1:1 or 4:2:2 only | | | | | | | | | | | | | | | |
| $C_1$ 1LH | all | all | all | all | 6 | 6 | 5 | 5 | 4 | 4 | 3 | 3 | 2 | 2 | 1 | 0 |
| $C_1$ 2HH | all | 6 | 6 | 5 | 5 | 4 | 4 | 3 | 3 | 2 | 2 | 1 | 1 | 0 | 0 | 0 |
| $C_1$ 2HL,LH | all | 6 | 5 | 5 | 4 | 4 | 3 | 3 | 2 | 2 | 1 | 1 | 0 | 0 | 0 | 0 |

TABLE 10-continued

| subband | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $C_1$ 3HH | all | 6 | 5 | 5 | 4 | 4 | 3 | 3 | 2 | 2 | 1 | 1 | 0 | 0 | 0 | 0 |
| $C_1$ 3HL,LH | all | 5 | 5 | 4 | 4 | 3 | 3 | 2 | 2 | 1 | 1 | 0 | 0 | 0 | 0 | 0 |
| $C_1$ 3LL | all | 0 | 0 | 0 | 0 | 0 | 0 | 0 | 0 | 0 | 0 | 0 | 0 | 0 | 0 | 0 |
| $C_2$ 1HL,HH | | | HL and HH always discarded for 4:1:1 or 4:2:2 only | | | | | | | | | | | | | |
| $C_2$ 1LH | all | all | all | all | 6 | 6 | 5 | 5 | 4 | 4 | 3 | 3 | 2 | 2 | 1 | 0 |
| $C_2$ 2HH | all | 6 | 6 | 5 | 5 | 4 | 4 | 3 | 3 | 2 | 2 | 1 | 1 | 0 | 0 | 0 |
| $C_2$ 2HL,LH | all | 6 | 5 | 5 | 4 | 4 | 3 | 3 | 2 | 2 | 1 | 1 | 0 | 0 | 0 | 0 |
| $C_2$ 3HH | all | 6 | 5 | 5 | 4 | 4 | 3 | 3 | 2 | 2 | 1 | 1 | 0 | 0 | 0 | 0 |
| $C_2$ 3HL,LH | all | 5 | 5 | 4 | 4 | 3 | 3 | 2 | 2 | 1 | 1 | 0 | 0 | 0 | 0 | 0 |
| $C_2$ 3LL | all | 0 | 0 | 0 | 0 | 0 | 0 | 0 | 0 | 0 | 0 | 0 | 0 | 0 | 0 | 0 |

Layer 0 contains all data not quantized away by quantizer 0. This would be luminance data only: all of 3LL; all but 4 bitplanes of 2HL, 2LH, 3HL, 3LH and 3HH; all but 5 bitplanes of 2HH and all but 6 bitplanes of 1HL and 1LH. Layer 1 contains all data not in layer 0 and not quantized away by quantizer 1. This would be luminance bitplanes 5 for 1HL and 1LH, bitplane 4 for 2 HH, bitplane 3 for 3HL and 3LH; all 3LL chrominance; all but 5 bitplanes for chrominance 3HL and 31H; and all but 6 bitplanes for chrominance 2HL, 2LH and 3HH. Finally, layer 15 would contain the LSB of 1LH chrominance.

Rate Control with Multiple Layers and Tile-Parts

There several well known techniques for rate control in compression systems. The simplist method is to pick a distortion for every "unit" compressed (a unit may be an 8×8 block in JPEG, a frame in a motion sequence, a tile of a single image, a subband of a tile in a wavelet coded image, etc.). If the distortion selected leads to a bitrate higher than the desired average bitrate, the distortion allowed is increased for new units as they are compressed. If the distortion selected leads to a bit rate lower than the desired average bitrate, the distortion allowed is decreased for new units as they are compressed.

A more complex method buffers the compressed data from some number of "units." The bitrate and/or distortion for each unit at each distortion level is stored. Then the distortion to allow across all the units in the buffer is determined when the buffer is full. If the buffer is sufficient to contain the entire image, extremely high quality results can be obtained. In JPEG 2000, layers are designed to contain increments to quality. Thus, selecting a distortion can mean selecting the number of layers to use for each code block or tile. A complete description of this type of rate control is in, David Taubman, "High Performance Scalable Image Compression with EBCOT," IEEE Transactions on Image Processing.

There are several disadvantages to this process. One disadvantage is that a buffer memory for the entire codestream is required. A second disadvantage is that the latency (time until any of the codestream is output) is high. A third disadvantage is that the second pass could take large amount of time.

Figure 15A:
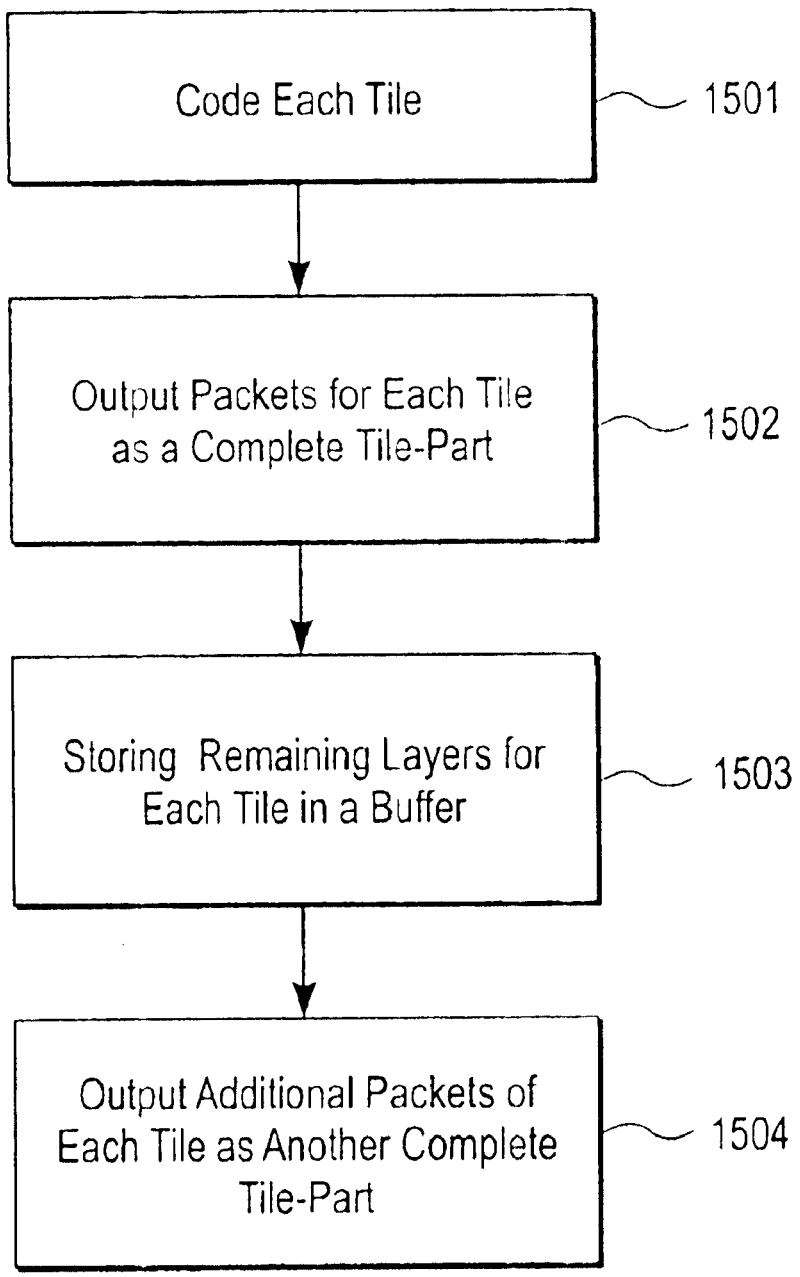
FIG. 15A illustrates a process for performing rate control.

To mitigate these problems, each tile of a JPEG 2000 codestream is encoded as described above with at least two layers. At the completion of encoding each tile, a number of packets (e.g., layer, resolution, precinct, tile-component) are output to the codestream as a complete tile-part. The remaining layers are stored in the buffer. A second pass through the remaining coded data in the buffer is optional. During this second pass, extra packets from each tile are appended to the codestream as complete tile-parts as space or time allows. If in a fixed-rate application, then only packets within the given rate are appended. If in a fixed time application, then only number of cycles allowed. One embodiment of this process is shown in FIG. 15A. Thus, these can be the 2 complete tile-parts output for each tile.

Figure 15B:
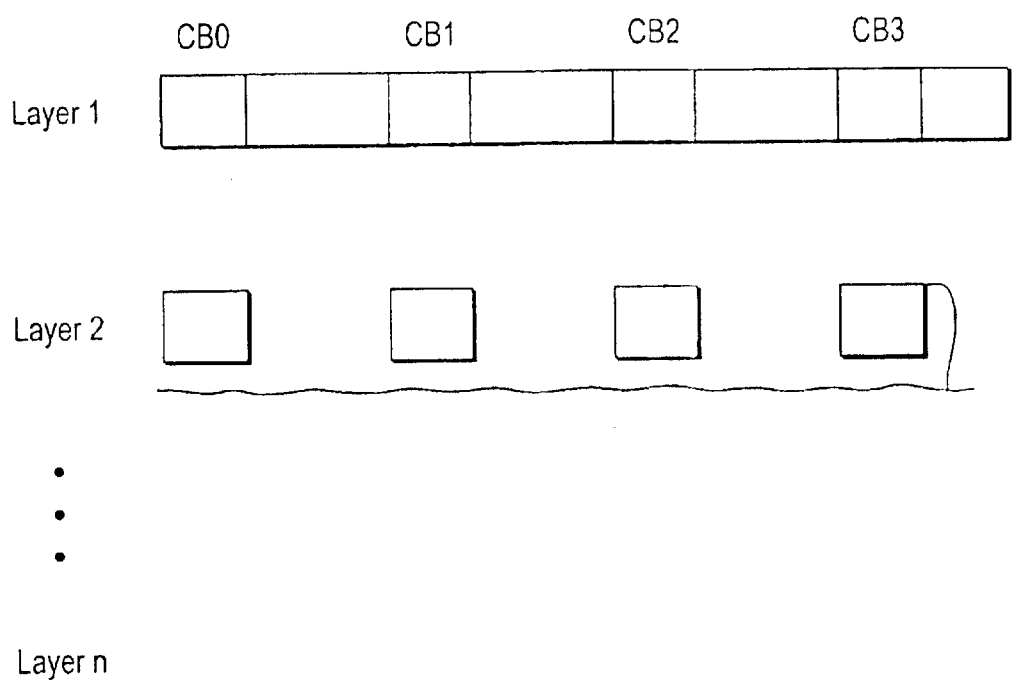
FIG. 15B illustrates an exemplary number of layers that may be subjected to first and second passes.

FIG. 15B illustrates a number of layers, layers 1-n. Layer 1 is output on the first pass, and the remaining layers are most likely below fixed-time or fixed-rate time limits. Layer 2 may be output on a second pass within fixed-time or fixed-rate requirements while achieving similar distortion over all the components.

The above process is advantageous in that it allows the buffer to store a fraction of the coded data, the first data can be output (transmitted or stored) sooner, and the second pass through the data can be faster because there is less data to process. Also less memory is required for buffering.

The criterion for selecting which packets go into the first set of tile-parts can be similar to any other rate control algorithm. In one embodiment, the rate of packets can be less than the desired average bitrate for the whole image. For example, if a final compressed bitstream at 2.0 bpp is desired, the first pass could place 1.5 bpp for every tile in the codestream, and buffer 1 bpp for every tile.

The second pass can select from the remaining data the packets to place in the second tile part of each tile. Thus, to obtain a 2.0 bpp average encoding, some tiles that had high distortion after the first pass could receive all the remaining data saved for the tile, while other tile parts which had low distortion after the first pass might not have any additional data transmitted.

Rate Control for Compressed Codestream Data

Some rate control techniques described herein include rate control performed on a compressed codestream based on a request implemented by selecting some number of layers to keep in the codestream. A parser may be used to produce a new codestream which shows the bitrate based on layers. This bitrate is equal to or less than the bitrate specified by the request.

The parser may use a data structure referred to herein as a "packet structure." Note that this data structure may be used for other purposes such as, for example, the versatile pocket data structure described below. In one embodiment, the packet structure includes a packet start pointer and packet length. It also contains a tile number, a resolution, a component, layer, and a precinct the packet belongs to. Finally, it also consists of a selection flag. This flag, when set to a predetermined value (e.g., 1), indicates if the packet is selected in the array for writing out to a new codestream.

In one embodiment, packets are read in sequential order from a codestream based on the progression order information indicated by the COD marker.

The number of bytes is computed based on the bitrate desired by the request. The number of bytes belonging to layer 0 is added up to a total. Then this total of bytes is compared with the number of bytes desired. If the total is less than the number of bytes desired, one additional layer is added to the total. The process continues until the total is equal to or greater than the number of bytes desired or all packets have been added.

During the process, those packets which have been added to the total, are marked as selected by the selection flag in the structure.

If the total is equal to the number of bytes desired, the addition process is stopped. If the total exceeds the number of bytes desired, the packets in the last layer added are subtracted from the total. This is done to guarantee that the bitrate is below the bitrate desired. Consequently, during the subtraction step, packets which have been subtracted from the total are marked unselected.

In one embodiment, the related markers such as SOT, COD, PLT are updated according to the request. Packets are written to the new codestream. The packet structure may be created using the following:

```
typedef struct __PACK__ {          /* packet structure */
   int     start;                  /* packet starting point */
   int     length;                 /* packet length */
   unsigned short    t;            /* tile number the packet belongs to */
   unsigned short    r;            /* resolution the packet belongs to */
   unsigned short    c;            /* component the packet belongs to */
   unsigned short    l;            /* layer the packet belongs to */
   unsigned short    p;            /* precinct the packet belongs to */
   unsigned char     select;       /* selection flag */
}Pack_t;
/* Store packets from tp->tile[i].Size[j]array to the packet structure array
*//* Layer progression (LRCP) order */
   if(progression_order == 0){
     j = 0;
     for(i=0;i<number_of_tile;i++){
       m = 0;
       for(l=0;<layer;l++){
         for(r=0;r<resolution+1;r++){
           for(c=0;c<component;c++){
             for(p=0;p<precinct[r];p++){
                tp->pk[j].start = tp->tile[i].pointer[m];
                tp->pk[j].length = tp->tile[i].Size[m];
                total_length += tp->tile[i].Size[m];
                tp->pk[j].t = i;
                tp->pk[j].r = r;
                tp->pk[j].l = l;
                tp->pk[j].c = c;
                tp->pk[j].p = p;
                m++;
                j++;
             }
           }
         }
       }
       num_packet[i] = m;
     }
   }
```

Versatile Packet Data Structure

The same packet data structure described above can be used to facilitate other parsing options, once packets are read into the structure.

For resolution parsing, the packets which are to be excluded are marked unselected. For example, given a 4 resolution codestream, and a request is to produce a 3-resolution codestream, a parser marks all packets which belong to resolution 4 unselected. Then the newly produced codestream contains only packets from resolution 1 up to resolution 3.

Similarly, for component parsing, progression conversion parsing, quality parsing can be performed step by step processing the packets in the structure.

The packet data structure can handle complex requests. For example, a request which requires the parser to produce a codestream which has a 3-resolution, 2-layer, and 1-component codestream.

Clipping After Each Inverse Transform

As a result of quantization performed on wavelet coefficients, the final decoded pixels are often outside of the original range of allowed pixels from the specified bit depth. Typically, these pixels are clipped to the original range so that further image processing or display devices can use the original bit depth.

For example, an eight bit image has pixel values between 0 and 255, inclusive. After lossy compression is used, the decoded image may contain values like −5 and 256. To provide an eight bit output, these values are clipped to 0 and 255 respectively. This clipping procedure always reduces pixel wise distortion because the original image did not contain pixels outside of the clipping bounds. This procedure is well known and recommend by the JPEG 2000 standard.

In addition to the bounds on the final output samples, there are bounds on the values coefficients can assume at the various stages of the wavelet transform. Just as quantization can change the final decoded samples to lie outside the original bounds, quantization can change the partially transformed wavelet coefficients to lie outside their original bounds. If these coefficients are clipped to their original bounds, distortion will decrease.

For example, after a horizontal (one dimensional) 5–3 reversible transform as specified by JPEG 2000 with 8 bit input samples, the maximum value of the low pass coefficient is +191, and the minimum possible value is −191. The high pass coefficient must be between −255 and 255 inclusive. After the vertical one dimensional transform, the Low-Low coefficients are bounded by −286 and 287. Thus when decoding an eight bit image, when the first level low-low pass coefficients are generated (by the inverse wavelet transfrom from a higher level), the coefficients can be clipped to −286 and +287, and distortion will decrease. Likewise after the first level vertical inverse transformation is done, the low pass coefficients can be clipped to −191,+ 191, and the high pass coefficients can be clipped to −255, 255.

For each subband, each filter, each transform level, and each image depth, there is a different maximum and minimum value for the coefficients. These maximum and minimum values can be computed by finding the signal that leads to the maximum and minimum and running the forward compression system and recording the maxima. The signals that lead to extreme values come from inputs where each pixel is either a maximum or minimum. Which pixels should be maximum and which pixels should be minimum can be determined by convolving sequences which are −1 when the wavelet coefficient is negative and +1 when the wavelet coefficient is negative. For the 5–3 filter used in JPEG 2000 Part I, the low pass signal of interest is [−1+1+1+1−1] and the high pass signal is [−1+1−1].

The signal (image) which will generate the largest LL value is:

$$\begin{matrix} +1 & -1 & -1 & -1 & +1 \\ -1 & +1 & +1 & +1 & -1 \\ -1 & +1 & +1 & +1 & -1 \\ -1 & +1 & +1 & +1 & -1 \\ +1 & -1 & -1 & -1 & +1 \end{matrix}$$

(where +1 must be replaced by the input maximum (e.g., 255) and −1 must be replaced by the input minimum (e.g., 0).

For irreversible filters, it is not necessary to actually run the system to determine the maxima, simply convolving the wavelet coefficients is sufficient. For the reversible 5–3 filter, however, the floor function is used in the computation of coefficients and is also used to determine the correct maxima.

Note that this may be used for other filters (e.g., a 9–7 filter).

Figure 28:
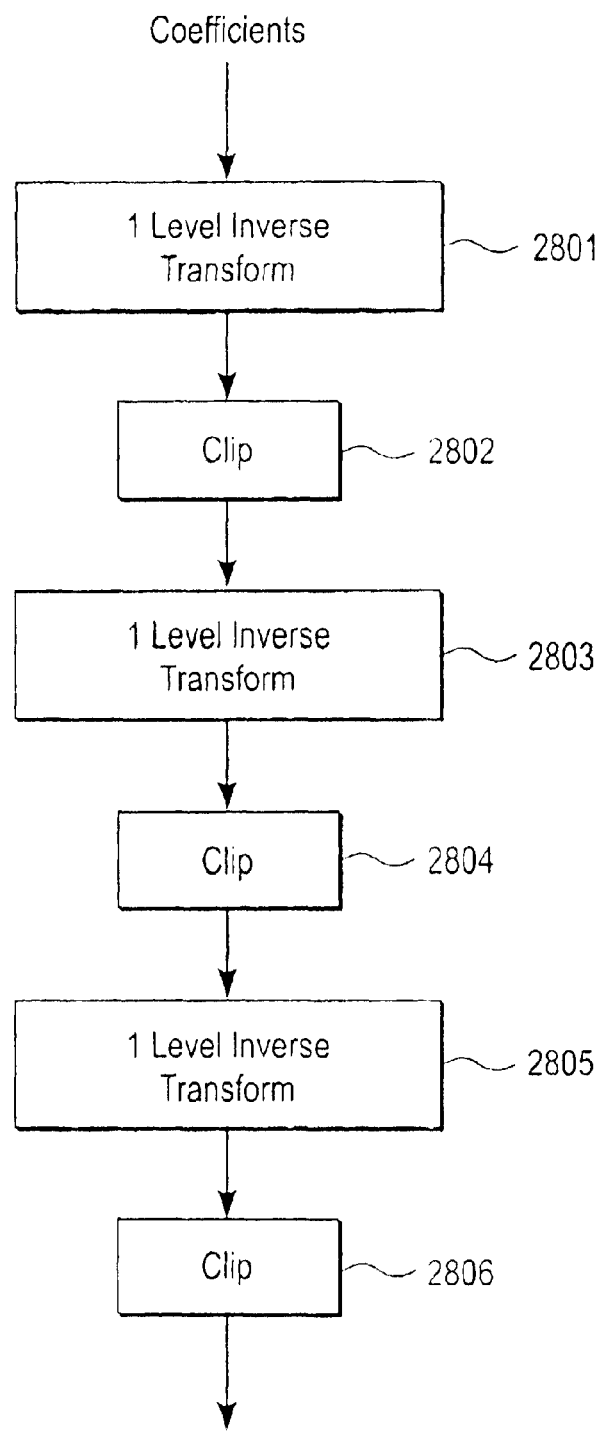
FIG. 28 is a flow diagram of one embodiment of a process for applying an inverse transform with clipping on partially transformed coefficients.

FIG. 28 is a flow diagram of one embodiment of a process for applying an inverse transform with clipping on partially transformed coefficients. The process is performed by processing logic, which may comprise hardware (e.g., circuitry, dedicated logic, etc.), software (such as that which runs on a general purpose computer system or a dedicated machine), or a combination of both.

Referring to FIG. 28, processing logic applies a first level inverse transform to coefficients (processing block 2801). Thereafter, processing logic clips the partially transformed coefficients to a predetermined range (processing block 2802). Next, processing logic applies a first level inverse transform to the clipped coefficients (processing block 2803) and clips the partially transformed coefficients to a predetermined range (processing block 2804), which is different than the range in processing block 2802. Again, processing logic applies a first level inverse transform to clipped coefficients (processing block 2805) and clips the partially transformed coefficients to still another predetermined range (processing block 2806).

Simplified Colorspace Handling

Figure 25:
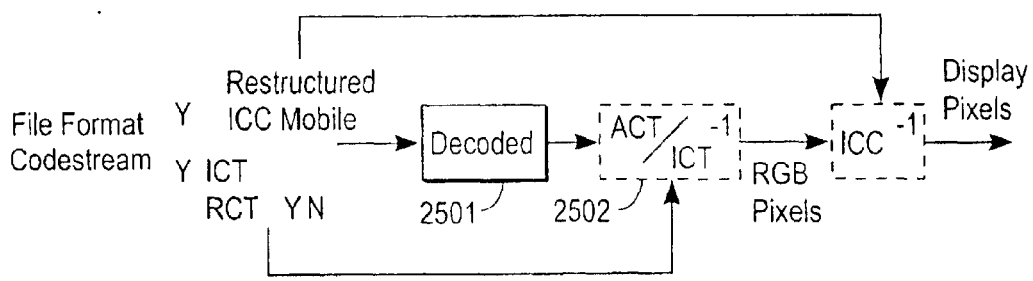
FIG. 25 is a block diagram of a prior art decoding process that includes color management.

A typical decoding process including color management is shown in FIG. 25. Referring to FIG. 25, a file with a file format (e.g., a file format described in the JPEG 2000 standard) containing a restricted ICC profile is provided to a decoding device. Decompression block 2501 decompresses the file by taking the codestream portion of the file and performing context modeling, entropy decoding, and applying an inverse wavelet transform, but does not perform color space operations. If the codestream indicates the RCT or ICT component transform should be used to decode the codestream, these will be performed by block 2502. That is, inverse RCT/ICT block 2502 takes the components and the "RCT Y/N" indication (RCT if yes, ICT is no) and performs the specified inverse transform and provides (non-display) RGB pixels. (If specified by the syntax, inverse level shifting is also performed.)

Finally, the ICC color profile from the file format along with information about the display device will be used to produce the output pixels.

Inverse ICC block 2503 receives the (non-display) RGB pixels and the ICC profile and applies an inverse color space transform to provide display RGB pixels.

Figure 26:
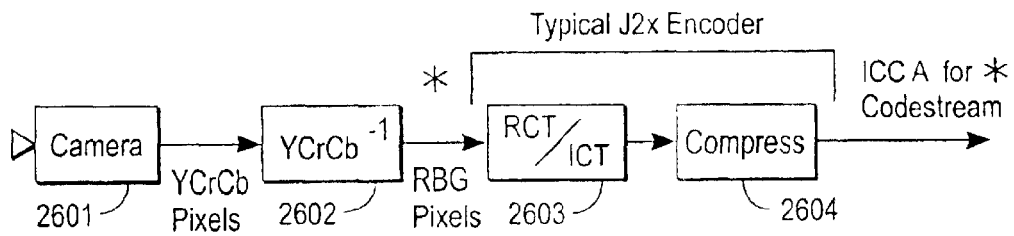
FIG. 26 illustrates one embodiment of a non-preferred camera encoder.
Figure 27:
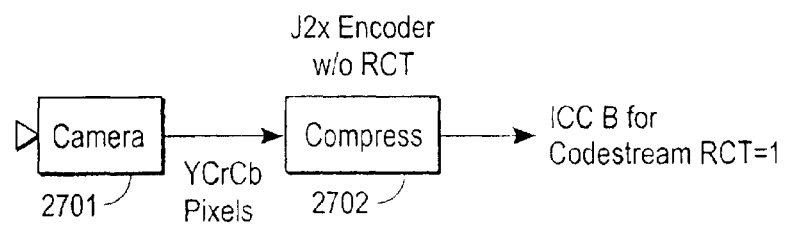
FIG. 27 illustrates one embodiment of a simpler camera encoder.

FIG. 26 illustrates one embodiment of a non-preferred camera encoder. Referring to FIG. 26, a camera generates YCrCb pixels. A converter 2602 converts the YCrCb pixels to RGB pixels and provides those two a typical JPEG 2000 encoder. The encoder comprises a RCT to ICT converter 2603 followed by a compressor 2604. The compressor generates an $ICC_A$ for codestream. FIG. 27 illustrates one embodiment of a simpler camera encoder. That is, instead of including RCT/ICT converter 2603 and compressor 2604, a simple camera encoder includes only compressor block 2702. Referring to FIG. 27, a camera 2701 generates YCrCb pixels and provides them to compressor 2702. Compressor comprises a JPEG 2000 encoder without an RCT conversion and generates an $ICC_B$ codestream with RCT equaling 1 (with syntax signaling that the inverse RCT should be used on decoding). The relationship between $ICC_B$ and $ICC_A$ is given by the following equation:

$$ICC_B = ICC_A \circ YCrCb^{-1} \circ RCT$$

where $\circ$ represents function composition.

Restricted ICC profiles are "syntaxes" for functions on pixels. A camera will typically write the same profile for all images, so $ICC_B$ is computed offline, and copied into each output file. In a prior art system there must be HW for $YCrCb^{-1}$ and RCT/ICT which operates on every pixel.

Coding 4:2:2 and 4:1:1 Data as 4:4:4 Data with Quantization

The JPEG 2000 standard is typically used to handling data in a 4:4:4 format. It is not capable of describing how to reconstruct data in 4:1:1 or 4:2:2 formats in a 4:4:4 format for output. In one embodiment, when encoding 4:1:1 data, the encoder treats 1 HL, 1 LH and 1 HH coefficients as zero. When encoding 4:2:2 data, the encoder treats 1 HL and 1 HH coefficients as zero. Thus, with all information in the extra subbands quantized to zero, a decoder is able to receive the codestream in a way it expects. In other words, the encoded data resembles 4:4:4 data that has been heavily quantized.

File Order for Thumbnail, Monitor, Printer, and Full Resolution and Quality

Multiple images at multiple resolutions are important in many image processing situations. Depending on the application, a user may want to select different images of different resolutions. For example, thumbnail images may be used as an index into a large number of images. Also, a screen resolution image may be the image used to send to a monitor for display thereon. A print resolution image may be of lower quality for printer applications.

In one embodiment, a codestream of an image is organized into sections so that different versions of the image, such as, for example, a thumbnail version, a screen version, a print version and a lossless version, is progressive by quality.

Figure 21:
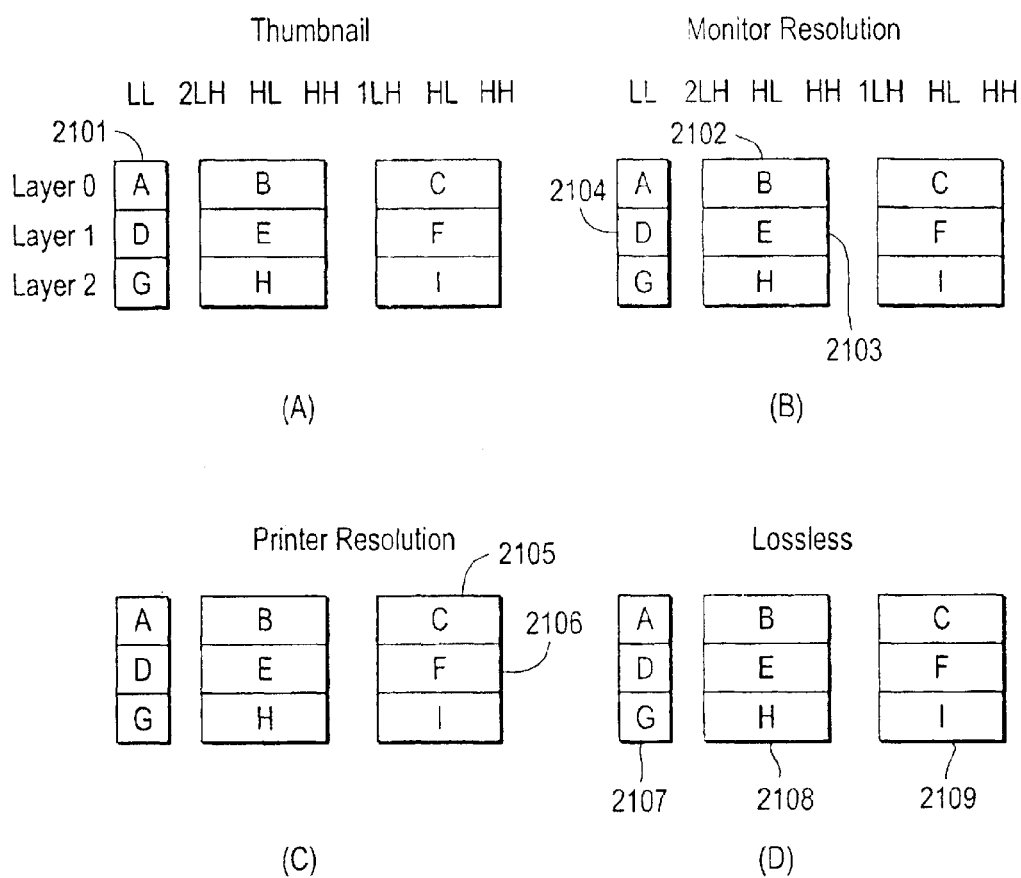
FIG. 21 illustrates an example progression with tile parts for a single server.

In one embodiment, the packets are arranged such that certain packets correspond to particular resolutions such as a thumbnail. The combination of these packets with other packets represents the monitor resolution image, which when combined with other packets may represent the printer version, etc. Using the POC and tile parts, portions of a codestream may be grouped together. For example, all the tiles of the thumbnail size may be grouped together followed by tiles for another resolution followed by tiles of another resolution, etc. FIG. 21 illustrates an example progression with tile parts for a single server. Each tile's thumbnail is grouped in tile-parts at the beginning of a file. FIG. 21A illustrates that tile-part 2101 is the only portion that is used for a thumbnail image. FIG. 21B illustrates that for a monitor resolution, tile-parts 2102–2104 have been included with tile-part 2101. FIG. 21C illustrates that for a printer resolution, tile-parts 2105 and 2106 have been included with tile-parts 2101–2104. Lastly, FIG. 21D illustrates that for a lossless version of the data, the remaining three tile-parts 2107–2108 are included with the rest of the tile-parts. These sets of tile parts may be placed on a server in this progressive order.

Figure 16:
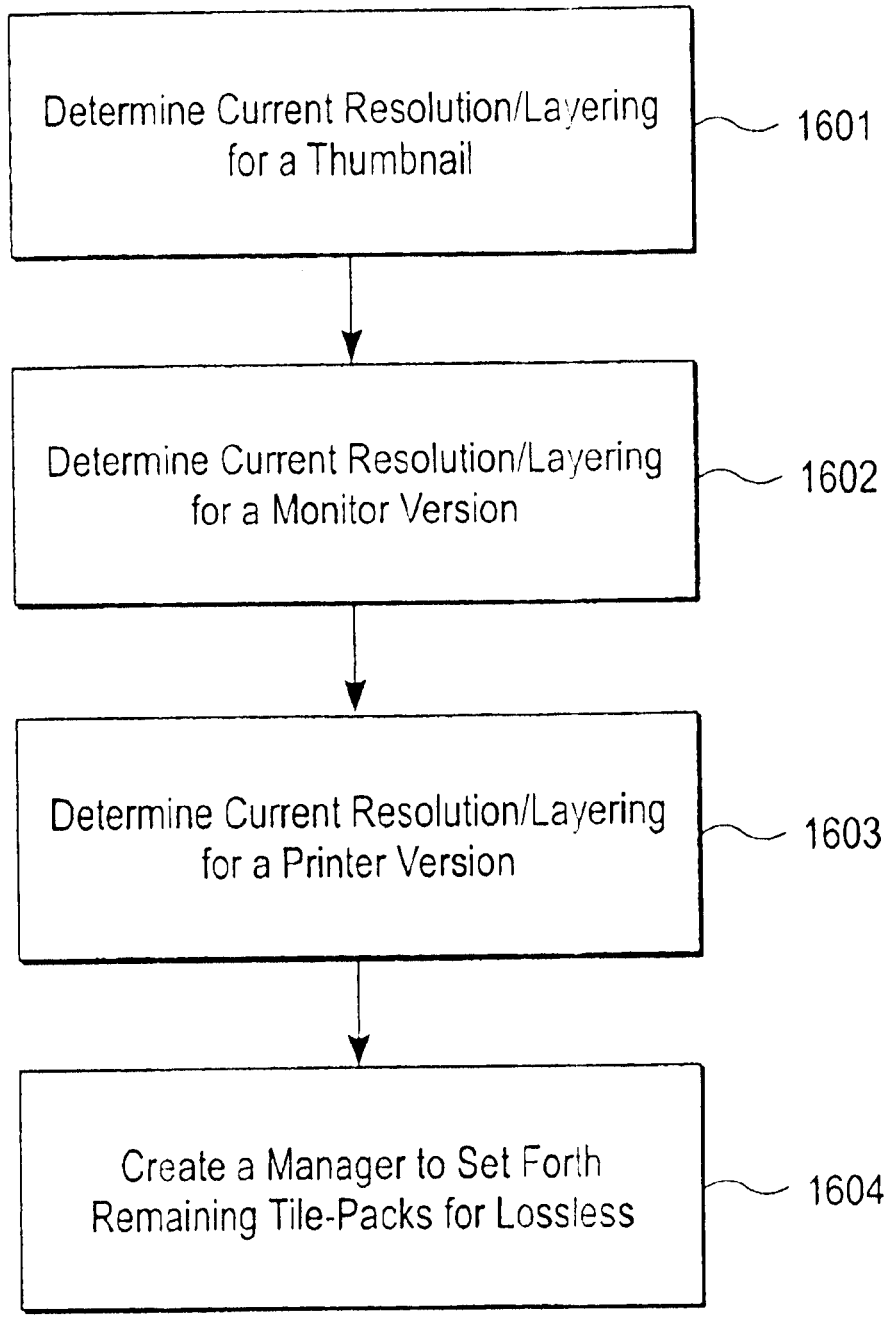
FIG. 16 illustrates one embodiment of the process for accessing the groupings of tile parts.

One embodiment of the process for accessing the groupings of tile parts is shown in FIG. 16. The process may be performed by processing logic that may comprise hardware (e.g., dedicated logic, circuitry, etc.), software (such as is run on a general purpose computer system or a dedicated machine), or a combination of both. The following steps assume that the image has been transformed with sufficient resolution levels and layers to divide the image into the four sizes.

Referring to FIG. 16, processing logic initially determines the correct resolution and layering for the thumbnail (processing block 1601). In one embodiment, to determine the correct resolution and layering for the thumbnail, processing logic creates a POC constrained to that resolution and layer for each tile and then creates a set of tile-parts and places this POC for each tile in the codestream.

Next, processing logic repeats processing block 1601 for the monitor resolution given that the thumbnail packets are already in the codestream (processing block 1602). Then, processing logic repeats processing block 1601 for the printer resolution given that the monitor packets are already in the codestream (processing block 1603).

Lastly, processing logic creates a POC marker with the extremes of the resolutions and layers for each tile (processing block 1604). In one embodiment, creating the POC with the extremes of the resolutions and layers is performed by creating a fourth set of tile-parts with the remaining tile-parts for a lossless version.

Note that the particular orders of the packets defined in the POCs are not of importance, only the limits.

An Exemplary Computer System

Figure 20:
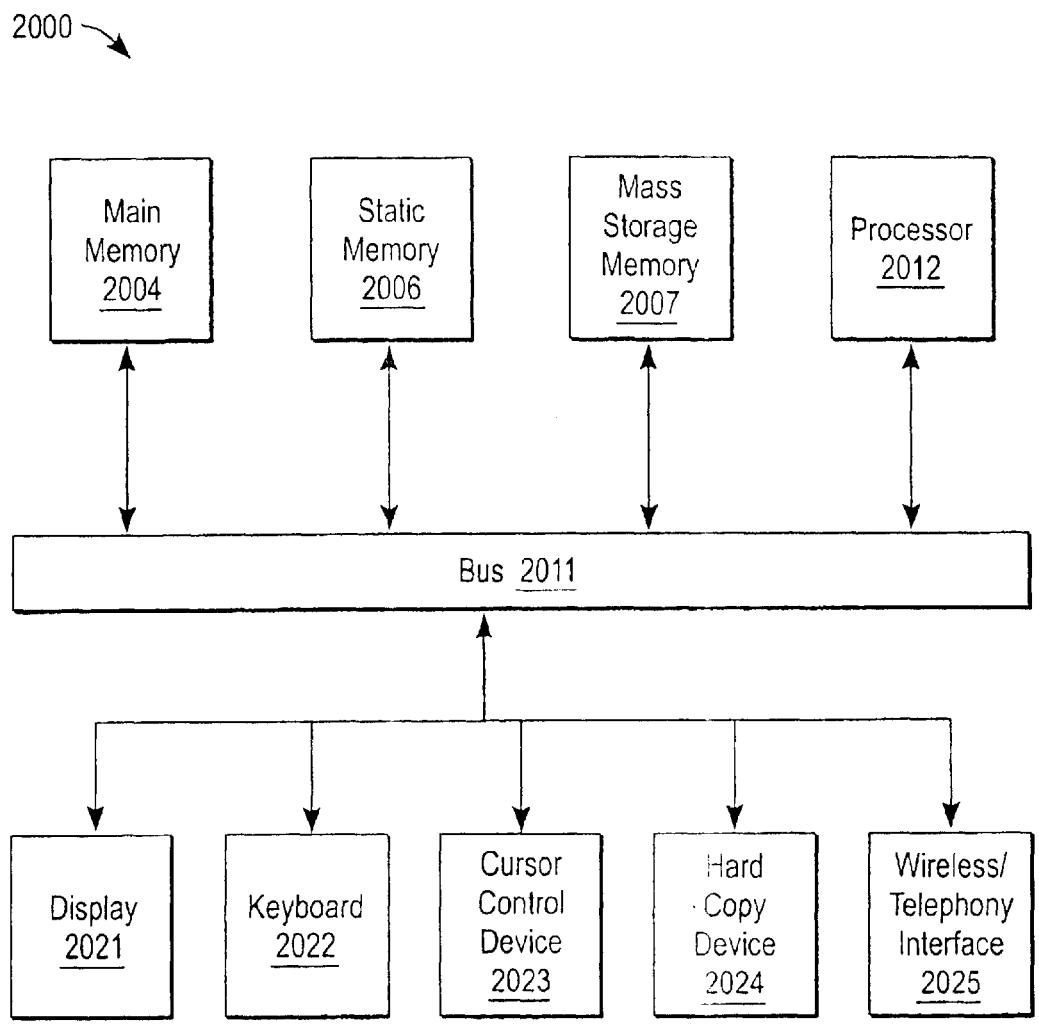
FIG. 20 is a block diagram of one embodiment of a computer system.

FIG. 20 is a block diagram of an exemplary computer system. Referring to FIG. 20, computer system 2000 may comprise an exemplary client 150 or server 100 computer system. Computer system 2000 comprises a communication mechanism or bus 2011 for communicating information, and a processor 2012 coupled with bus 2011 for processing information. Processor 2012 includes a microprocessor, but is not limited to a microprocessor, such as, for example, Pentium™, PowerPC™, Alpha™, etc.

System 2000 further comprises a random access memory (RAM), or other dynamic storage device 2004 (referred to as main memory) coupled to bus 2011 for storing information and instructions to be executed by processor 2012. Main memory 2004 also may be used for storing temporary variables or other intermediate information during execution of instructions by processor 2012.

Computer system 2000 also comprises a read only memory (ROM) and/or other static storage device 2006 coupled to bus 2011 for storing static information and instructions for processor 2012, and a data storage device 2007, such as a magnetic disk or optical disk and its corresponding disk drive. Data storage device 2007 is coupled to bus 2011 for storing information and instructions.

Computer system 2000 may further be coupled to a display device 2021, such as a cathode ray tube (CRT) or liquid crystal display (LCD), coupled to bus 2011 for displaying information to a computer user. An alphanumeric input device 2022, including alphanumeric and other keys, may also be coupled to bus 2011 for communicating information and command selections to processor 2012. An additional user input device is cursor control 2023, such as a mouse, trackball, trackpad, stylus, or cursor direction keys, coupled to bus 2011 for communicating direction information and command selections to processor 2012, and for controlling cursor movement on display 2021.

Another device that may be coupled to bus 2011 is hard copy device 2024, which may be used for printing instructions, data, or other information on a medium such as paper, film, or similar types of media. Furthermore, a sound recording and playback device, such as a speaker and/or microphone may optionally be coupled to bus 2011 for audio interfacing with computer system 2000. Another device that may be coupled to bus 2011 is a wired/wireless communication capability 2025 to communication to a phone or handheld palm device.

Note that any or all of the components of system 2000 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A system comprising:
   a memory sized to include lines to store a band of an image and additional lines;
   a wavelet processing logic comprising
      a wavelet transform to generate coefficients when applied to data in the memory;
      access logic to read data from the memory into line buffers to supply data stored in the memory to the wavelet transform and to store coefficients in the memory, such that after data stored at a first pair of lines is read from memory into the line buffers of the access logic, the access logic reuses the first pair of lines to store coefficients generated by the wavelet transform that are associated with a second pair of lines different from the first pair of lines.

2. The system defined in claim 1 wherein the access logic stores coefficients in contiguous lines of memory with coefficients from a same subband and decomposition level adjacent to each other.

3. The system defined in claim 1 wherein a first line of each of the first and second pairs of lines are located in the memory at an offset with respect to each other.

4. The system defined in claim 3 wherein the wavelet transform comprises a plurality of transform levels and coefficient levels, and wherein the access logic stores first outputs of the wavelet transform for each coefficient level in additional lines within a distance of the offset.

5. The system defined in claim 4 wherein size of the offset is different for each transform level.

6. The system defined in claim 5 wherein the size of the offset is equal to:

$$2^{(transform\ level\ of\ coefficient\ being\ stored)}.$$

7. The system defined in claim 6 wherein, during decomposition, the offset for storing a first row of rows of L1 coefficients in the memory is two lines from the first row of data of an image associated with the L1 coefficients, and the offset for storing a first row of L2 coefficients is four lines from the first row of L1 coefficients associated with the L2 coefficients.

8. The system defined in claim 1 wherein the access logic stores coefficients associated with a decomposition level greater than level three in the lines of the memory that previously stored the band of the image.

9. The system defined in claim 3 wherein additional lines relating to the offset are above a line storing the band of the image.

10. The system defined in claim 1 wherein the wavelet transform is a forward wavelet transform.

11. The system defined in claim 1 wherein the wavelet transform is an inverse wavelet transform.

12. A method comprising:

reading data from a memory into line buffers to apply a wavelet transform thereto; and storing coefficients created by applying the wavelet transform at lines in the memory, including access logic reusing a first pair of lines to store coefficients generated by a wavelet transform, that are associated with a second pair of lines different from the first pair of lines, after data stored at a first pair of lines is read from memory into the line buffers of the access logic, and wherein a first line of each of the first and second pairs of lines are located in the memory at an offset with respect to each other.

13. The method defined in claim 12 wherein the wavelet transform includes a plurality of transform levels and coefficient levels, and wherein the method further comprises the access logic storing first outputs of the wavelet transform for each coefficient level in additional lines within a distance of the offset.

14. The method defined in claim 13 wherein size of the offset is different for each transform level.

15. The method defined in claim 14 wherein the size of the offset is equal to:

$$2^{(\text{transform level of coefficient being stored})}.$$

16. The method defined in claim 15 wherein, during decomposition, the offset for storing a first row of L1 coefficients in the memory is two lines from the first row of data of an image associated with the L1 coefficients, and the offset for storing a first row of L2 coefficients is four lines from the first row of L1 coefficients associated with the L2 coefficients.

17. The method defined in claim 12 further comprising access logic storing coefficients associated with a decomposition level greater than level three in the lines of the memory that previously stored a band of an image.

18. The method defined in claim 17 wherein additional lines relating to the offset are above a line storing the band of the image.

19. An article of manufacture comprising at least one recordable media storing executable instructions thereon which, when executed by a processing device, cause the processing device to:

read data from a memory into line buffers to apply a wavelet transform thereto; and store coefficients created by applying the wavelet transform at lines in the memory when instructions to cause the processing device to store coefficients includes instructions which when executed cause the processing device to reuse a first pair of lines to store coefficients generated by a wavelet transform, that are associated with a second pair of lines different from the first pair of lines, after data stored at a first pair of lines is read from memory into the line buffers of access logic, and wherein a first line of each of the first and second pairs of lines are located in the memory at an offset with respect to each other.

20. An apparatus comprising:

means for reading data from a memory into line buffers to apply a wavelet transform thereto; and means for storing coefficients created by applying the wavelet transform at lines in the memory, wherein the means for storing includes means for reusing a first pair of lines to store coefficients generated by a wavelet transform, that are associated with a second pair of lines different from the first pair of lines, after data stored at a first pair of lines is read from memory into the line buffers of access logic, and wherein a first line of each of the first and second pairs of lines are located in the memory at an offset with respect to each other.

21. The article of manufacture defined in claim 19 wherein the wavelet transform includes a plurality of transform levels and coefficient levels, and wherein the article of manufacture further comprises the access logic storing first outputs of the wavelet transform for each coefficient level in additional lines within a distance of the offset.

22. The article of manufacture defined in claim 21 wherein size of the offset is different for each transform level.

23. The article of manufacture defined in claim 22 wherein the size of the offset is equal to:

$$2^{(\text{transform level of coefficient being stored})}.$$

24. The article of manufacture defined in claim 21 wherein, during decomposition, the offset for storing a first row of L1 coefficients in the memory is two lines from the first row of data of an image associated with the L1 coefficients, and the offset for storing a first row of L2 coefficients is four lines from the first row of L1 coefficients associated with the L2 coefficients.

25. The article of manufacture defined in claim 19 wherein the method further comprises access logic storing coefficients associated with a decomposition level greater than level three in the lines of the memory that previously stored a band of an image.

26. The article of manufacture defined in claim 25 wherein additional lines relating to the offset are above a line storing the band of the image.

27. The apparatus defined in claim 20 wherein the wavelet transform includes a plurality of transform levels and coefficient levels, and wherein the apparatus further comprises means for the access logic storing first outputs of the wavelet transform for each coefficient level in additional lines within a distance of the offset.

28. The apparatus defined in claim 27 wherein size of the offset is different for each transform level.

29. The apparatus defined in claim 28 wherein the size of the offset is equal to:

$$2^{(\text{transform level of coefficient being stored})}.$$

30. The apparatus defined in claim 27 wherein, during decomposition, the offset for storing a first row of L1 coefficients in the memory is two lines from the first row of data of an image associated with the L1 coefficients, and the offset for storing a first row of L2 coefficients is four lines from the first row of L1 coefficients associated with the L2 coefficients.

31. The apparatus defined in claim 20 further comprising means for access logic storing coefficients associated with a decomposition level greater than level three in the lines of the memory that previously stored a band of an image.

32. The apparatus defined in claim 31 wherein additional lines relating to the offset are above a line storing the band of the image.

* * * * *